United States Patent
Jin et al.

(10) Patent No.: US 12,281,823 B2
(45) Date of Patent: Apr. 22, 2025

(54) THERMAL MANAGEMENT SYSTEM

(71) Applicant: Hanon Systems, Daejeon (KR)

(72) Inventors: Hyeongkyu Jin, Daejeon (KR); Moojoong Kim, Daejeon (KR); Seong Hun Kim, Daejeon (KR); Hyeon Woo Noh, Daejeon (KR); Sung Je Lee, Daejeon (KR); Hae-Jun Lee, Daejeon (KR); Dong Woo Hwang, Daejeon (KR); In-Guk Hwang, Daejeon (KR)

(73) Assignee: HANON SYSTEMS, Daejeon (KR)

(*) Notice: Subject to any disclaimer, the term of this patent is extended or adjusted under 35 U.S.C. 154(b) by 532 days.

(21) Appl. No.: 17/421,812

(22) PCT Filed: Dec. 12, 2019

(86) PCT No.: PCT/KR2019/017554
§ 371 (c)(1),
(2) Date: Jul. 9, 2021

(87) PCT Pub. No.: WO2020/145527
PCT Pub. Date: Jul. 16, 2020

(65) Prior Publication Data
US 2022/0097487 A1 Mar. 31, 2022

(30) Foreign Application Priority Data
Jan. 9, 2019 (KR) .................. 10-2019-0002727

(51) Int. Cl.
*F25B 41/39* (2021.01)
*B60H 1/00* (2006.01)
(Continued)

(52) U.S. Cl.
CPC ......... *F25B 41/39* (2021.01); *B60H 1/00278* (2013.01); *B60H 1/3223* (2013.01);
(Continued)

(58) Field of Classification Search
CPC .......... B60H 1/00278; B60H 1/3223; B60H 1/3227; B60H 1/32284; B60K 11/04;
(Continued)

(56) References Cited

U.S. PATENT DOCUMENTS 9,016,080 B2 * 4/2015 Brodie ................. F28D 20/028
62/239
10,589,594 B2 * 3/2020 Heyl ..................... B60L 3/0023
(Continued)

FOREIGN PATENT DOCUMENTS

DE 102016112089 A1 * 1/2018 ......... B60H 1/00278
DE 102017109311 A1 * 11/2018 ............ B60H 1/004
(Continued)

OTHER PUBLICATIONS

Machine Translation KR 20180045621A (Year: 2018).*
(Continued)

*Primary Examiner* — Len Tran
*Assistant Examiner* — Gustavo A Hincapie Serna
(74) *Attorney, Agent, or Firm* — NORTON ROSE FULBRIGHT US LLP

(57) ABSTRACT

A thermal management system, comprising: a primary coolant circulation system for cooling a first coolant by circulating the first coolant which is heat-exchanged with cooling water through a first water-cooled condenser; a secondary coolant circulation system for cooling a battery chiller by using a second coolant which is heat-exchanged with the first coolant of the primary coolant circulation system; and a second cooling line for cooling a battery by circulating cooling water which is heat-exchanged through the battery chiller, wherein the number of revolutions of the first condenser of the primary coolant circulation system is less than the number of revolutions of the second condenser of the secondary coolant circulation system, or the first coolant and (Continued)

the second coolant are heat-exchanged via the cooling water, such that the battery can be cooled efficiently during rapid charging.

4 Claims, 12 Drawing Sheets

(51) Int. Cl.
*B60H 1/32* (2006.01)
*B60K 11/04* (2006.01)
*B60L 58/26* (2019.01)
*H01M 10/613* (2014.01)
*H01M 10/625* (2014.01)
*H01M 10/6556* (2014.01)
*H01M 10/6568* (2014.01)

(52) U.S. Cl.
CPC ....... *B60H 1/3227* (2013.01); *B60H 1/32284* (2019.05); *B60K 11/04* (2013.01); *B60L 58/26* (2019.02); *H01M 10/613* (2015.04); *H01M 10/625* (2015.04); *H01M 10/6556* (2015.04); *H01M 10/6568* (2015.04); *H01M 2220/20* (2013.01)

(58) Field of Classification Search
CPC ........ B60K 2001/005; B60K 2001/006; B60K 1/00; B60L 58/26; H01M 10/613; H01M 10/625; H01M 10/6556; H01M 10/6568; H01M 2220/20
USPC .......................................................... 62/244
See application file for complete search history.

(56) References Cited

U.S. PATENT DOCUMENTS

| | | | | |
|---|---|---|---|---|
| 11,130,385 | B2* | 9/2021 | Boger | B60H 1/3208 |
| 11,285,783 | B2* | 3/2022 | Sonnekalb | B60H 1/00385 |
| 11,305,616 | B2* | 4/2022 | Poolman | B60H 1/3232 |
| 2008/0245503 | A1* | 10/2008 | Wilson | B60H 1/00371 |
| | | | | 165/42 |
| 2012/0204596 | A1* | 8/2012 | Takenaka | F25B 6/04 |
| | | | | 62/510 |
| 2012/0222846 | A1* | 9/2012 | Kadle | B60H 1/00342 |
| | | | | 165/166 |
| 2014/0158322 | A1* | 6/2014 | Homann | B60H 1/2221 |
| | | | | 165/61 |
| 2015/0121949 | A1* | 5/2015 | Heo | F25D 11/022 |
| | | | | 62/504 |
| 2018/0281556 | A1* | 10/2018 | Koberstein | B60L 3/0046 |
| 2019/0168570 | A1* | 6/2019 | Lee | B60H 1/32284 |
| 2019/0168578 | A1* | 6/2019 | Kim | B60H 1/323 |
| 2019/0178546 | A1* | 6/2019 | Lin | F25B 41/20 |
| 2019/0299751 | A1* | 10/2019 | Poolman | B60H 1/3223 |
| 2020/0047626 | A1* | 2/2020 | Szkrybalo | H01M 10/6568 |
| 2020/0180392 | A1* | 6/2020 | Lee | B60H 1/143 |
| 2020/0259229 | A1* | 8/2020 | Wu | H01M 10/625 |
| 2020/0274210 | A1* | 8/2020 | Bae | H01M 10/63 |
| 2020/0313255 | A1* | 10/2020 | Wu | B60H 1/323 |
| 2021/0031588 | A1* | 2/2021 | Yahia | F25B 49/02 |
| 2021/0221199 | A1* | 7/2021 | Lee | B60H 1/32284 |
| 2021/0309070 | A1* | 10/2021 | Ishizeki | B60H 1/00921 |
| 2021/0316594 | A1* | 10/2021 | Kawano | B60H 1/323 |
| 2022/0048358 | A1* | 2/2022 | Yahia | B60H 1/00278 |
| 2022/0097567 | A1* | 3/2022 | Lian | H01M 10/486 |
| 2022/0097657 | A1* | 3/2022 | Matsunaga | B60S 1/52 |
| 2022/0144039 | A1* | 5/2022 | Benouali | B60H 1/00921 |
| 2022/0176774 | A1* | 6/2022 | Tang | B60H 1/3227 |
| 2022/0234416 | A1* | 7/2022 | Suzuki | B60H 1/32284 |
| 2022/0236017 | A1* | 7/2022 | Benouali | H01M 10/625 |

FOREIGN PATENT DOCUMENTS

| | | | | |
|---|---|---|---|---|
| DE | 102018104301 A1 | * | 8/2019 | ............. B60H 1/004 |
| EP | 3614071 B1 | * | 12/2021 | ............... F25B 1/00 |
| JP | 2020056536 A | * | 4/2020 | ............... F25B 1/10 |
| KR | 20110134213 A | | 12/2011 | |
| KR | 20140066806 A | | 6/2014 | |
| KR | 20140147365 A | | 12/2014 | |
| KR | 20180045621 A | * | 5/2018 | ............... B60H 1/00 |
| KR | 20180093184 A | | 8/2018 | |
| WO | WO-2018149703 A1 | * | 8/2018 | ......... B60H 1/32284 |

OTHER PUBLICATIONS

Machine Translation WO-2018149703-A1 (Year: 2018).*
International Search Report issued in PCT/KR2019/017554 on Mar. 26, 2020.

* cited by examiner

MAXIMUM COOLING MODE

MILD HEATING MODE

DEHUMIDIFYING AND HEATING MODE

→ FLOW OF REFRIGERANT
→ FLOW OF COOLING WATER

THERMAL MANAGEMENT SYSTEM

CROSS REFERENCE TO RELATED APPLICATIONS

This application is a national phase under 35 U.S.C. § 371 of International Application No. PCT/KR2019/017554 filed on Dec. 12, 2019, which claims the benefit of priority from Korean Patent Application No. 10-2019-0002727 filed on Jan. 9, 2019. The entire contents of these applications are incorporated herein by reference in their entirety.

TECHNICAL FIELD

The present invention relates to a thermal management system, and more particularly, to a thermal management system that may efficiently cool a battery when rapidly charging the battery of an electric vehicle.

BACKGROUND ART

In recent years, electric vehicles are being spotlighted as solutions to problems such as the implementation of environmentally friendly technologies and energy depletion in an automotive field.

The electric vehicles run using a motor that is driven by receiving power from a battery or a fuel cell, and therefore, carbon emissions are low and noise is low. In addition, the electric vehicles are eco-friendly because motors that have higher energy efficiency than conventional engines are used.

In such an electric vehicle, thermal management is important because a large amount of heat is generated during operation of the battery and the driving motor, and in particular, cooling the battery is important as rapid charging is becoming more and more popular which allows the battery to be fully charged within 10 minutes on demand.

However, in order to rapidly charge the battery of the electric vehicle, a high cooling capacity is required, which causes an excessive load to be applied to the existing cooling system, and it is insufficient to obtain sufficient cooling capacity.

To solve such a problem, it is possible to increase the cooling capacity of the battery by using a high-capacity compressor in a heat pump system for heating and cooling, but since the high-capacity compressor has very severe noise and vibration and does not satisfy durability against high pressure and high rotational speed, it is difficult to apply the high-capacity compressor.

RELATED ART DOCUMENT

Patent Document

KR 2014-0147365 A (2014.12.30)

DISCLOSURE

Technical Problem

An embodiment of the present invention is directed to providing a thermal management system capable of securing sufficient cooling capacity of a battery during rapid charging of the battery and efficiently cooling the battery, thereby reducing energy required for operation of a compressor.

Technical Solution

In one general aspect, a thermal management system includes: a primary refrigerant circulation system 200 that circulates a first refrigerant for air conditioning of the interior; and a secondary refrigerant circulation system 500 that exchanges heat with the first refrigerant and circulates a second refrigerant to cool a battery.

The first refrigerant and the second refrigerant may exchange the heat through cooling water.

Each of the primary refrigerant circulation system 200 and the secondary refrigerant circulation system 500 may include a compressor, a condenser, an expansion valve, and a chiller, and the compressor of the secondary refrigerant circulation system 500 may have a higher rotational speed (RPM) than that of the compressor of the primary refrigerant circulation system 200.

A ratio of the rotational speed (RPM) between the compressor of the primary refrigerant circulation system 200 and the compressor of the secondary refrigerant circulation system 500 may be 1:4.

The thermal management system may further include a first cooling line 301 that cools the condenser of the primary refrigerant circulation system 200 by circulating the cooling water; and a second cooling line 302 that cools the battery by circulating the cooling water heat-exchanged through the chiller of the secondary refrigerant circulation system 500.

Each of the first cooling line 301 and the second cooling line 302 may further include a radiator for cooling the cooling water with air.

The primary refrigerant circulation system 200 may be provided as a separate system for cooling the second refrigerant of the secondary refrigerant circulation system 500.

In another general aspect, a thermal management system includes: a first cooling line 301 that cools a first water-cooled condenser 220 by circulating cooling water; a primary refrigerant circulation system 200 that includes a first compressor 210 and the first water-cooled condenser 220, and cools a first refrigerant by circulating the first refrigerant heat-exchanged with the cooling water through the first water-cooled condenser 220; a secondary refrigerant circulation system 500 that includes a second compressor 510 and a battery chiller 540, and cools the battery chiller 540 using a second refrigerant heat-exchanged with the first refrigerant of the primary refrigerant circulation system 200; and a second cooling line 302 that cools a battery 350 by circulating the cooling water heat-exchanged through the battery chiller 540, wherein the first compressor 210 is operated at a lower rotational speed that that of the second compressor 510.

The primary refrigerant circulation system 200 may be provided as a separate system for cooling the second refrigerant of the secondary refrigerant circulation system 500.

The first refrigerant of the primary refrigerant circulation system 200 and the second refrigerant of the secondary refrigerant circulation system 500 may be heat-exchanged using the cooling water as a medium.

The primary refrigerant circulation system 200 may further include a third expansion valve 251 that throttles or bypasses the first refrigerant discharged from the first water-cooled condenser 220 or blocks a flow of the first refrigerant, and a first chiller 252 that performs heat-exchange between the first refrigerant discharged from the third expansion valve 251 and the cooling water, and the secondary refrigerant circulation system 500 may further include a second water-cooled condenser 520 that performs heat-exchange between the cooling water heat-exchanged with the first chiller 252 and the second refrigerant, and a fourth expansion valve 530 that throttles or bypasses the second refrigerant discharged from the second water-cooled condenser 520 or blocks a flow of the second refrigerant.

A third cooling line 303 for circulating the cooling water, which is a medium for exchanging heat between the first refrigerant and the second refrigerant, may be provided as a separate system from the first cooling line 301 and the second cooling line 302.

The first cooling line 301 may include a first radiator 310 for cooling the cooling water with air, and the third cooling line 303 may include a second radiator 380 for cooling the cooling water with air.

In another general aspect, a thermal management system includes: a first cooling line 301 that cools a first water-cooled condenser 220 by circulating cooling water; a primary refrigerant circulation system 200 that includes a first compressor 210 and the first water-cooled condenser 220, and cools a first refrigerant by circulating the first refrigerant heat-exchanged with the cooling water through the first water-cooled condenser 220; a secondary refrigerant circulation system 500 that includes a second compressor 510 and a battery chiller 540, and cools the battery chiller 540 using a second refrigerant heat-exchanged with the first refrigerant of the primary refrigerant circulation system 200; and a second cooling line 302 that cools a battery 350 by circulating the cooling water heat-exchanged through the battery chiller 540, wherein the primary refrigerant circulation system 200 and the secondary refrigerant circulation system 500 are heat-exchanged through a heat exchange medium of a different type from that of the first refrigerant and the second refrigerant.

The primary refrigerant circulation system 200 may be provided as a separate system for cooling the second refrigerant of the secondary refrigerant circulation system 500.

The first refrigerant of the primary refrigerant circulation system 200 and the second refrigerant of the secondary refrigerant circulation system 500 may be heat-exchanged using the cooling water as a medium.

The primary refrigerant circulation system 200 may further include a third expansion valve 251 that throttles or bypasses the first refrigerant discharged from the first water-cooled condenser 220 or blocks a flow of the first refrigerant, and a first chiller 252 that performs heat-exchange between the first refrigerant discharged from the third expansion valve 251 and the cooling water, and the secondary refrigerant circulation system 500 may further include a second water-cooled condenser 520 that performs heat-exchange between the cooling water heat-exchanged with the first chiller 252 and the second refrigerant, and a fourth expansion valve 530 that throttles or bypasses the second refrigerant discharged from the second water-cooled condenser 520 or blocks a flow of the second refrigerant.

A third cooling line 303 for circulating the cooling water, which is a medium for exchanging heat between the first refrigerant and the second refrigerant, may be provided as a separate system from the first cooling line 301 and the second cooling line 302.

The first cooling line 301 may include a first radiator 310 for cooling the cooling water with air, and the third cooling line 303 may include a second radiator 380 for cooling the cooling water with air.

The primary refrigerant circulation system 200 may include: a refrigerant closed loop in which the first compressor 210, the first water-cooled condenser 220, the first expansion valve 225, the air-cooled condenser 230, the third expansion valve 251, and the first chiller 252 are sequentially connected to circulate the refrigerant; a cooling line disposed between the air-cooled condenser 230 and the third expansion valve 251 and between the first chiller 252 and the first compressor 210 to circulate the refrigerant, and including a second expansion valve 225 and an evaporator 242; and a refrigerant heat exchanger 233 disposed on the cooling line and exchanging heat between the refrigerant flowing into the second expansion valve 225 and the refrigerant discharged from the evaporator 242.

The thermal management system may further include a heating line 301-1 that heats the interior by circulating the cooling water; and a cooling line 301-2 that cools a battery 350 or an electrical component 460 by circulating air or the cooling water.

The secondary refrigerant circulation system 500 may further include a second water-cooled condenser 520 that exchanges heat between the cooling water heat-exchanged with the first chiller 252 and the second refrigerant; and a fourth expansion value 530 that throttles or bypasses the second refrigerant discharged from the second water-cooled condenser 520 or blocks a flow of the second refrigerant.

The cooling line 301-2 may include a first connection line 302-1 branched from one side of the cooling line 301-2 and connected to the heating line 301-1; and a second connection line 302-2 branched from the other side of the cooling line 301-2 and connected to the heating line 301-1.

The first connection line 302-1, the second connection line 302-2, and the heating line 301 may be connected to a first direction switching valve 410, and the cooling line 302 and the heating line 301 may be connected to each other or may be disconnected by the first direction switching valve 410.

The electrical component 460, the first chiller 252, and the second water-cooled condenser 520 may be disposed on the second connection line 302-2.

The cooling line 302 may include a third connection line 302-3 connected in parallel with the battery 350, and the third connection line 302-3 is connected to the cooling line 301-2 by a third direction switching valve 330, such that the cooling water may flow to the third connection line 302-3 or the flow may be blocked by the third direction switching valve 330.

The heating line 301-1 may include a heater core 440 that heats the interior using heated air by performing heat-exchange between the cooling water heat-exchanged with the first refrigerant through the first water-cooled condenser 220 and the air flowing into the interior; and a cooling water heater 430 disposed in the front of the heater core 440 in a flow direction of the cooling water to heat the cooling water.

Advantageous Effects

The thermal management system of the present invention may secure the sufficient cooling capacity of the battery during rapid charging of the battery, and may efficiently cool the battery, thereby reducing the energy required for the operation of the compressor.

In addition, since the compressor is operated at a relatively low pressure and low rotational speed, the noise and vibration may be reduced, and the durability of the compressor may be improved.

BEST MODE

Hereinafter, a thermal management system according to the present invention having the configuration as described above will be described in detail with reference to the accompanying drawings.

Figure 1:
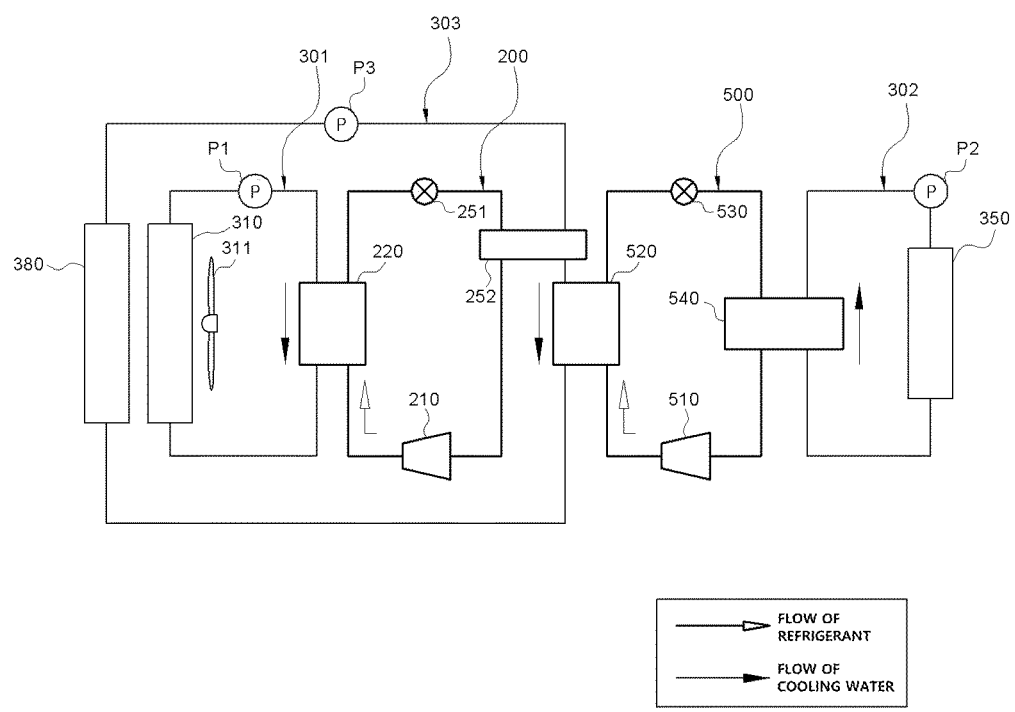
FIG. 1 is a configuration diagram illustrating a thermal management system according to an embodiment of the present invention.

FIG. 1 is a configuration diagram illustrating a thermal management system according to an embodiment of the present invention.

Referring to FIG. 1, a thermal management system according to the present invention may generally include a refrigerant circulation line through which refrigerant is circulated to cool the interior, and a cooling water circulation line through which cooling water is circulated to cool parts. In addition, the refrigerant circulation line may include a primary refrigerant circulation system 200 for circulating a first refrigerant and a secondary refrigerant circulation system 500 for circulating a second refrigerant. In addition, the cooling water circulation line may include a first cooling line 301 that circulates cooling water and cools the first refrigerant, a second cooling line 302 that circulates the cooling water, is cooled by being heat-exchanged with the second refrigerant, and cools a battery 350 using the cooling water, and a third cooling line 303 that mutually heat-exchanging the first refrigerant and the second refrigerant using the cooling water as a medium.

First, the first cooling line 301 may include a first radiator 310, a cooling water pump P1, and a first water-cooled condenser 220.

The first radiator 310 may be a heat exchanger for cooling the cooling water circulated along the first cooling line 301, and may be cooled by air-cooled manner by a cooling fan 311 provided on one side thereof.

The cooling water pump P1 is a means for pumping the cooling water so that the cooling water is circulated along the first cooling line 301. In addition, the cooling water pump P1 is installed on a cooling water line between the first radiator 310 and the first water-cooled condenser 220, such that the cooling water cooled in the first radiator 310 by the operation of the cooling water pump P1 may be supplied to the first water-cooled condenser 220.

The first water-cooled condenser 220 is a heat exchanger that exchanges heat between the cooling water flowing along the first cooling line 301 and the first refrigerant flowing along the primary refrigerant circulation system 200.

In addition, the primary refrigerant circulation system 200 may include a first compressor 210, the first water-cooled condenser 220, a third expansion valve 251, and a first chiller 252. Here, the primary refrigerant circulation system 200 may further include a separate expansion valve and an evaporator branched in parallel from a refrigerant loop to cool the interior of a vehicle, and may use the first chiller 252 as an evaporator in some cases.

The first compressor 210 may be an electrical compressor driven by being supplied with power, and serves to suck and compress the first refrigerant and discharge the sucked and compressed first refrigerant toward the first water-cooled condenser 220.

The first water-cooled condenser 220 serves to perform heat exchange between the first refrigerant discharged from the first compressor 210 and the cooling water flowing along the first cooling line 301, condense the first refrigerant into a liquid refrigerant, and transfer the liquid refrigerant toward the third expansion valve 251.

The third expansion valve 251 may serve to throttle or bypass the refrigerant or block a flow of the refrigerant, and may be disposed at the rear of the first water-cooled condenser 220 in a flow direction of the refrigerant.

The first chiller 252 may be disposed at the rear of the third expansion valve 251 in the flow direction of the refrigerant, and may be heat-exchanged with the cooling water to cool the cooling water flowing along the third cooling line 303.

In addition, the third cooling line 303 may include a second radiator 380, a cooling water pump P3, the first chiller 252, and a second water-cooled condenser 520.

The second radiator 380 may be a heat exchanger for cooling the cooling water circulated along the third cooling line 303, and the second radiator 380 may be disposed in close proximity to the first radiator 310 in parallel, and may be cooled by an air-cooled manner by a cooling fan 311.

The cooling water pump P3 is a means for pumping the cooling water so that the cooling water is circulated along the third cooling line 303. In addition, the cooling water pump P3 is installed on a cooling water line between the second radiator 380 and the first chiller 252, such that the cooling water cooled in the second radiator 380 by the operation of the cooling water pump P3 may be supplied to the first chiller 252.

The first chiller 252 may cool the cooling water flowing along the third cooling line 303 as described above, and the cooled cooling water may be supplied to the second water-cooled condenser 520 to cool a second refrigerant passing through the second water-cooled condenser 520.

The second water-cooled condenser 520 is a heat exchanger that exchanges heat between the cooling water flowing along the third cooling line 303 and the second refrigerant flowing along the secondary refrigerant circulation system 500. In addition, the second water-cooled condenser 520 serves to perform heat exchange between the second refrigerant discharged from the second compressor 510 and the cooling water flowing along the third cooling line 303, condense the second refrigerant into a liquid refrigerant, and transfer the liquid refrigerant toward a fourth expansion valve 251.

In addition, the secondary refrigerant circulation system 500 may include a second compressor 510, a second water-cooled condenser 520, a fourth expansion valve 530, and a battery chiller 540.

The second compressor 510 may be an electrical compressor driven by being supplied with power, and serves to suck and compress the second refrigerant and discharge the sucked and compressed second refrigerant toward the second water-cooled condenser 520.

The second water-cooled condenser 520 serves to perform heat exchange between the second refrigerant discharged from the second compressor 510 and the cooling water flowing along the third cooling line 303, condense the second refrigerant into a liquid refrigerant, and transfer the liquid refrigerant toward the fourth expansion valve 530.

The fourth expansion valve 530 may serve to throttle or bypass the refrigerant or block a flow of the refrigerant, and may be disposed at the rear of the second water-cooled condenser 520 in a flow direction of the refrigerant.

The battery chiller 540 may be disposed at the rear of the fourth expansion valve 530 in the flow direction of the refrigerant, and may be heat-exchanged with the cooling water to cool the cooling water flowing along the second cooling line 302.

In addition, the second cooling line 302 may include the battery chiller 540, the cooling water pump P2, and a battery 350.

The battery chiller 540 is a heat exchanger that exchanges heat between the second refrigerant flowing along the secondary refrigerant circulation system 500 and the cooling water following along the second cooling line 302.

The cooling water pump P2 is a means for pumping the cooling water so that the cooling water is circulated along the second cooling line 302. In addition, the cooling water pump P2 is installed on a cooling water line between the battery chiller 540 and the battery 350, such that the cooling water cooled in the battery chiller 540 by the operation of the cooling water pump P2 may be supplied to the battery 350 to cool the battery 350.

As a result, the cooling water flowing along the first cooling line 301 is cooled while passing through the first radiator 310, and then cools the first refrigerant flowing along the primary refrigerant circulation system 200 in the first water-cooled condenser 220, the first refrigerant flowing along the primary refrigerant circulation system 200 cools the cooling water flowing along the third cooling line 303 in the first chiller 252, the cooling water flowing along the third cooling line 303 cools the second refrigerant flowing along the secondary refrigerant circulation system 500 in the second water-cooled condenser 520, the second refrigerant flowing along the secondary refrigerant circulation system 500 cools the cooling water flowing along the second cooling line 302 in the battery chiller 540, and the battery 350 is then cooled using the cooled cooling water in the second cooling line 302.

That is, the primary refrigerant circulation system 200 and the secondary refrigerant circulation system 500 are provided as two independent refrigerant systems, respectively, and each include a compressor, and the first refrigerant circulated along the primary refrigerant circulation system 200, which is a closed loop, and the second refrigerant circulated along the secondary refrigerant circulation system 500, which is a closed loop, may be heat-exchanged using the cooling water circulated along the third cooling line 303, which is a separate system, as a medium.

As a result, a pressure of the refrigerant is relatively low in the secondary refrigerant circulation system 500 compared to the primary refrigerant circulation system 200, such that compression efficiency of the compressor may be improved and maximum performance may be achieved.

In addition, by cooling the battery using two compressors with a relatively small capacity as in the present invention, compared to cooling the battery using one compressor with a relatively large capacity, cooling performance sufficient to rapidly charge a battery of an electric vehicle may be secured, and durability of the compressor may be improved. In addition, since noise and vibration are distributed into the two compressors, noise and vibration may be reduced compared to using one compressor with a large capacity. In addition, according to the present invention, since less power is consumed by the compressors compared to using one compressor with a large capacity, system efficiency is high. In addition, an air volume for heat dissipation from the radiator is insufficient because the electric vehicle is stopped at the time of rapidly charging the battery of the electric vehicle, but according to the present invention, the cooling performance may be satisfied even with a small air volume.

Here, according to the present invention, the first compressor 210 of the primary refrigerant circulation system 200 may be operated at lower rotational speed (RPM) than that of the second compressor 510 of the secondary refrigerant circulation system 500. Alternatively, the first compressor 210 and the second compressor 510 may be driven at different rotational speeds that are not the same. As the result, since the noise and vibration of the two compressors do not overlap, the overall noise and vibration may be further reduced.

In addition, the first chiller 252 of the primary refrigerant circulation system 200 and the second water-cooled condenser 520 of the secondary refrigerant circulation system 500 may be spaced apart from each other, thereby reducing thermal shock between the first chiller 252 and the second water-cooled condenser 520. In addition, no components may be provided between the first chiller 252 and the second water-cooled condenser 520 on the cooling water line of the third cooling line 303. In addition, the first chiller 252 and the second water-cooled condenser 520 may be integrally configured so that the first refrigerant and the second refrigerant are heat-exchanged using a cooling water medium, which is a heat exchange medium of a different type from the first refrigerant and the second refrigerant.

Figure 2:
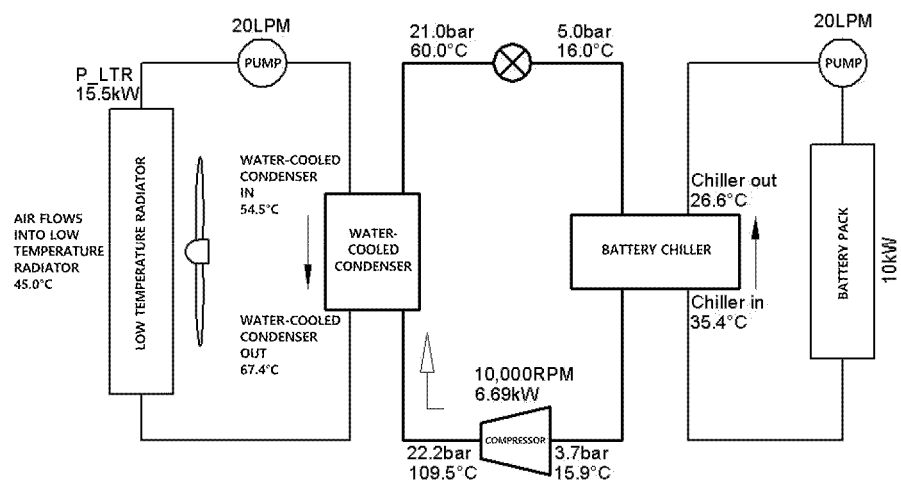
FIGS. 2 and 3 are a diagram and a PH chart illustrating operation simulation results of a conventional heat exchange system using one refrigerant circulation system.
Figure 3:
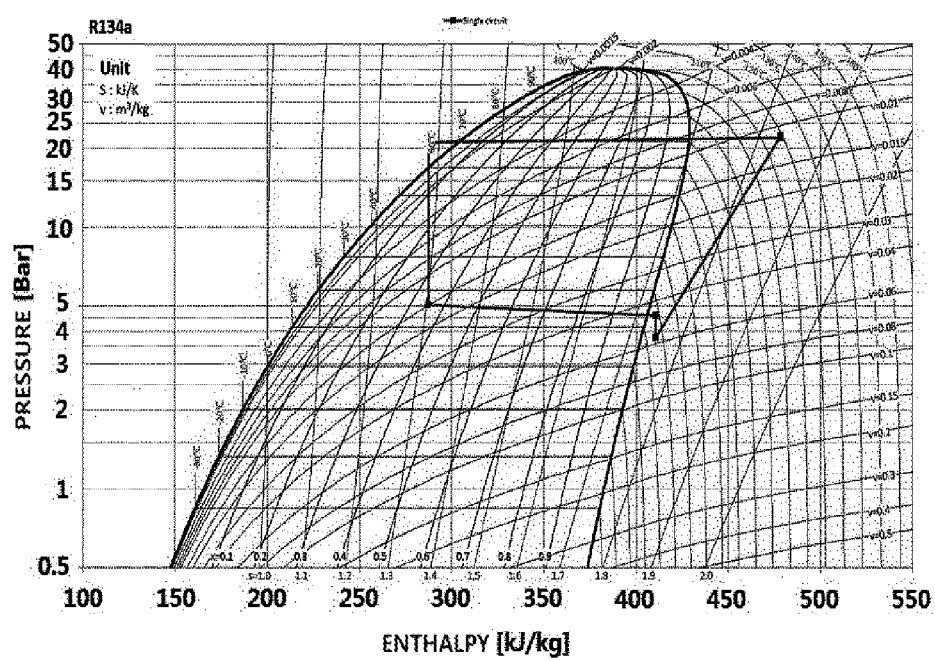
Figure 4:
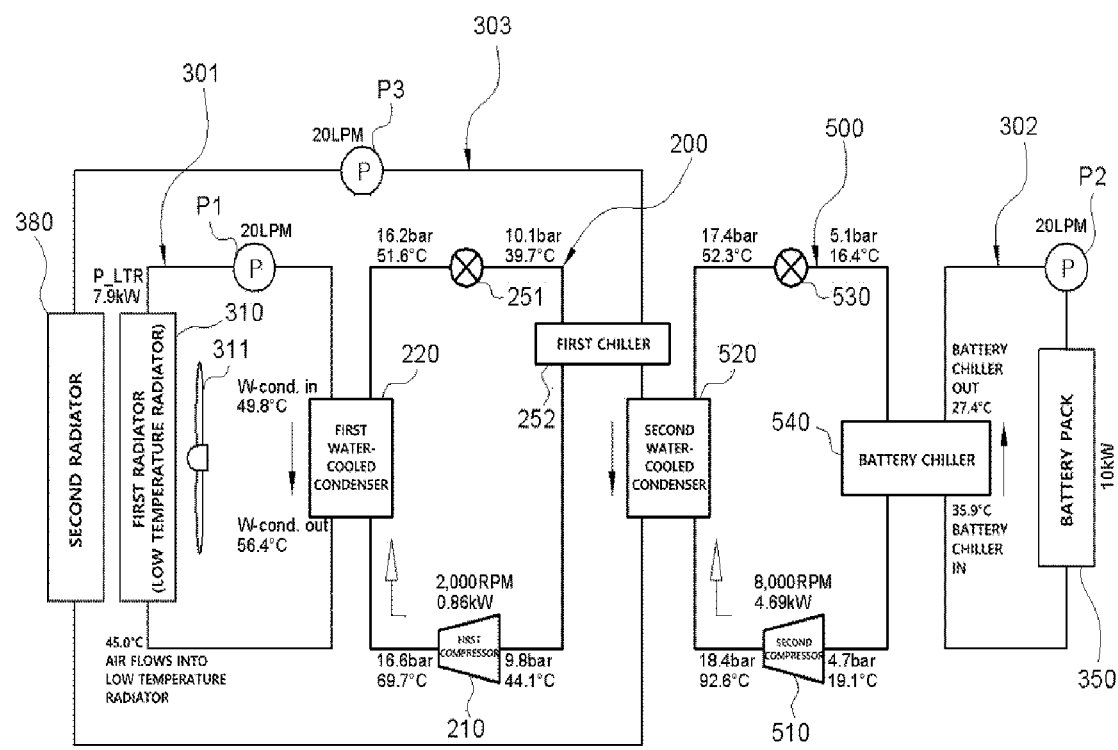
FIGS. 4 and 5 are a diagram and a PH chart illustrating operation simulation results of a thermal management system according to an embodiment of the present invention.
Figure 5:
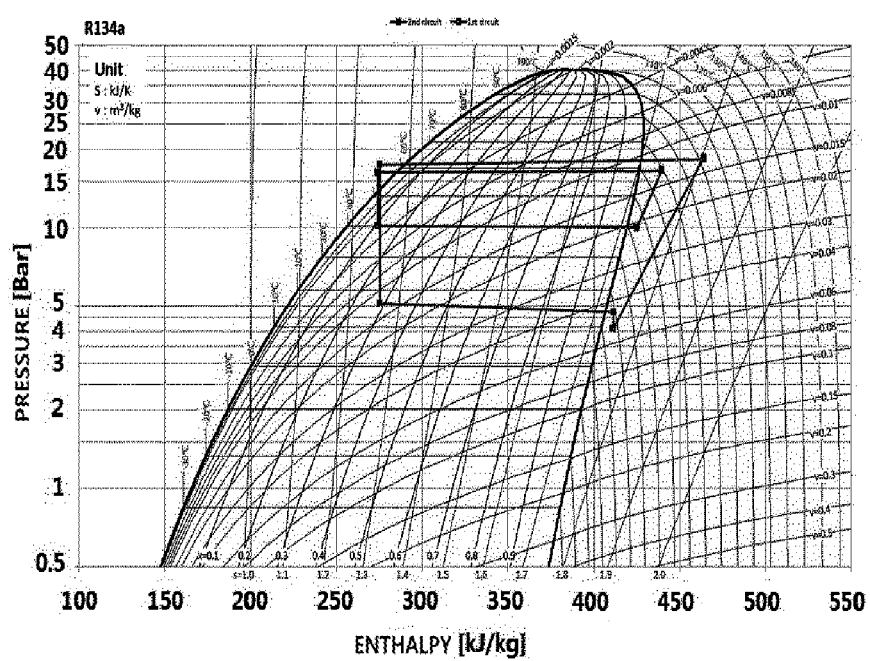

FIGS. 2 and 3 are a diagram and a PH chart illustrating operation simulation results of a conventional heat exchange system using one refrigerant circulation system, and FIGS. 4 and 5 are a diagram and a PH chart illustrating operation simulation results of a thermal management system according to an embodiment of the present invention.

As illustrated, in the conventional thermal exchange system that rapidly cools a battery with a capacity of 10 kW using one refrigerant circulation system, the power consumption of the compressor is relatively large as 6.69 kW and the rotation speed is high as 10,000 RPM, whereas when the battery is cooled using the two refrigerant circulation systems of the present invention, the power consumption of the compressor is relatively as small as 0.86 kW and 4.69 kW, respectively, and the rotational speed is relatively as low as 2,000 RPM and 8,000 PRM, respectively. Therefore, it may be seen that a compressor with a smaller capacity may be used in the present invention compared to the conventional thermal exchange system, and the sum of the power consumption of the two compressors of the present invention is smaller than the power consumption of one conventional compressor, so that the overall system efficiency is increased. In addition, since the load which is conventionally shared by one compressor is distributed into two compressors in the present invention and the compressors are operated at different rotational speeds, the noise and vibration may be reduced. In addition, referring to the pressure and PH charts of the refrigerant on inlet and outlet sides of the compressor, conventionally, the pressure of the outlet side of the compressor is relatively high, whereas in the present invention, the pressure of the outlet side of the compressor is formed to be relatively low, so that the power consumption of the compressor required for compression of the refrigerant may be reduced, and thus the efficiency of the system may be improved.

Figure 6:
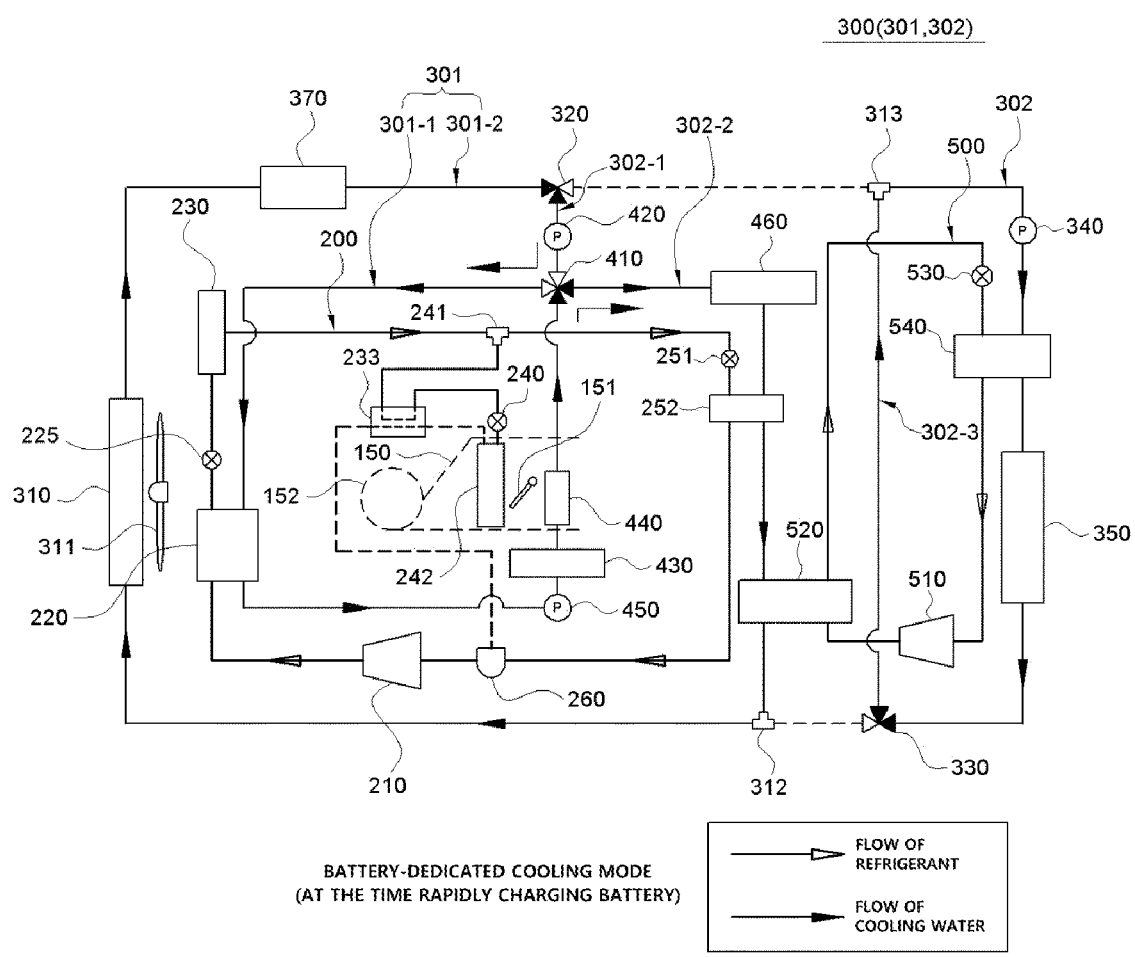
FIG. 6 is a configuration diagram illustrating an operating state in a battery-dedicated cooling mode of a thermal management system according to another embodiment of the present invention.

FIG. 6 is a configuration diagram illustrating a thermal management system according to another embodiment of the present invention.

Referring to FIG. 6, the thermal management system according to the present invention may generally include a primary refrigerant circulation system 200 in which a first refrigerant is circulated to cool the interior and cool cooling water, a secondary refrigerant circulation system 500 in which a second refrigerant is circulated to cool the cooling water, and a cooling water circulation line 300 in which the cooling water is circulated to heat the interior and cool parts. In addition, the cooling water circulation line 300 may include a first cooling line 301 including a heating line 301-1 for heating the interior and a cooling line 301-2 for cooling of an electrical component 460 or a battery 350, and a second cooling line 302 for cooling the battery 350.

The primary refrigerant circulation system 200 may include a first compressor 210, a first water-cooled condenser 220, a first expansion valve 225, an air-cooled condenser 230, a refrigerant branch portion 241, a second expansion valve 240, an evaporator 242, a refrigerant heat exchanger 233, an accumulator 260, a third expansion valve 251, and a first chiller 252.

The first compressor 210 may be an electrical compressor driven by being supplied with power, and serves to suck and compress the refrigerant and discharge the sucked and compressed refrigerant toward the first water-cooled condenser 220.

The first water-cooled condenser 220 serves to perform heat exchange of the refrigerant discharged from the first compressor 210 with the cooling water to condense the refrigerant into liquid refrigerant, and transfer the liquid refrigerant toward the first expansion valve 225.

The first expansion valve 225 may serve to throttle or bypass the refrigerant or block a flow of the refrigerant, and may be disposed at the rear of the first water-cooled condenser 220 in a flow direction of the refrigerant.

The air-cooled condenser 230 serves as a condenser or an evaporator, and a function of the air-cooled condenser 230 may be varied according to the role of the first expansion valve 225. That is, when the primary refrigerant circulation system 200 is used as an air conditioner loop, the first expansion valve 225 is fully opened to pass the refrigerant and the air-cooled condenser 230 serves as a condenser together with the first water-cooled condenser 220, and when the primary refrigerant circulation system 200 is used as a heat pump loop, the first expansion valve 225 throttles the refrigerant and the air-cooled condenser 230 serves as an evaporator. In addition, the air-cooled condenser 230 may be cooled or heated in an air-cooled manner by external air.

The refrigerant branch portion 241 may be formed at a rear side of the air-cooled condenser 230 in the flow direction of the refrigerant, and the refrigerant branch portion 241 may be branched into two lines so that one line is connected to the evaporator 242 and the other line is connected to the first chiller 252.

The second expansion valve 240 and the third expansion valve 251 may serve to throttle or pass the refrigerant, or block the flow of the refrigerant. In addition, the second expansion valve 240 and the third expansion valve 251 may be configured in parallel. That is, the refrigerant line may be branched into two lines from the refrigerant branch portion 241, the second expansion valve 240 may be disposed on one of the two branched refrigerant lines, and the third expansion valve 251 may be disposed on the other refrigerant line. At this time, the second expansion valve 240 may be disposed in the front of the evaporator 242, and the third expansion valve 251 may be disposed in the front of the first chiller 252.

The evaporator 242 is disposed at the rear of the second expansion valve 240 in the flow direction of the refrigerant and is provided inside an air conditioner 150 of a vehicle, such that air flowing by a blower 152 of the air conditioner is cooled through the evaporator 242 and supplied to the interior of the vehicle to be used for cooling the interior of the vehicle.

The refrigerant heat exchanger 233 serves to improve cooling performance by performing heat-exchange between the refrigerant flowing into the second expansion valve 240 and the refrigerant discharged from the evaporator 242. Here, an inlet side refrigerant line through which the refrigerant flows into the evaporator 242 connecting the refrigerant branch portion 241 and the second expansion valve 240 passes through the refrigerant heat exchanger 233, an outlet side refrigerant line through which the refrigerant is discharged from the evaporator 242 connecting the evaporator 242 and the accumulator 260 passes through the refrigerant heat exchanger 233, and heat exchange may occur between the refrigerants passing through the inlet side refrigerant line and the outlet side refrigerant line. Thus, the refrigerant may be further cooled before flowing into the second expansion valve 240 by the refrigerant heat exchanger 233, and through the evaporator 242, the cooling performance may be improved and the efficiency of the cooling system may be improved.

In particular, the refrigerant heat exchanger 233 is connected in parallel with the air-cooled condenser 230 and the chiller 252. That is, the refrigerant heat exchanger 233 is not disposed in series with the refrigerant line between the air-cooled condenser 230 and the chiller 252, but is disposed adjacent to the evaporator 242, such that the refrigerant heat exchanger 233 and the evaporator 242 may be disposed and connected in series with each other. If the refrigerant heat exchanger 233 is disposed in series between the air-cooled condenser 230 and the chiller 252, heating performance may be reduced because the refrigerant heat exchanger 233 acts as a pressure drop on a low pressure side in a heating mode. Conversely, if the refrigerant heat exchanger 233 is connected in parallel, the heating performance as well as the cooling performance are increased, and this is because there is no refrigerant heat exchanger 233 between the condensers 220 and 230 and the chiller 252 on the flow of the refrigerant in the heating mode.

The first chiller 252 may be disposed at the rear of the third expansion valve 251 in the flow direction of the refrigerant, and may perform heat-exchange with the cooling water to cool the cooling water. As a result, the second expansion valve 240 and the evaporator 242 form a set, the third expansion valve 251 and the first chiller 252 form another set, and the two sets are configured in parallel on the refrigerant line. In addition, the refrigerant line may be joined at the rear side of the evaporator 242 and the chiller 252 in the flow direction of the refrigerant to form one refrigerant line.

In addition, the accumulator 260 may separate a liquid refrigerant and a gaseous refrigerant among the refrigerants and supply only the gaseous refrigerant to the first compressor 210. Here, the accumulator 260 may be disposed at and connected to a point where the rear side of the evaporator 242 and the rear side refrigerant line of the first chiller 252 are joined, and the accumulator 260 may be disposed at the front of the first compressor 210 in the flow direction of the refrigerant.

On the first cooling line 301, the heating line 301-1 may include a first water-cooled condenser 220, a first cooling water pump 450, a cooling water heater 430, a heater core 440, and a first direction switching valve 410.

The first water-cooled condenser 220 may exchange heat with each other as the refrigerant and the cooling water pass therethrough as described above.

The first cooling water pump 450 is a means for pumping the cooling water so that the cooling water is circulated along the heating line 301-1, and may be disposed at the rear of the first water-cooled condenser 220 in the flow direction of the cooling water and installed on the cooling water line.

The cooling water heater 430 is an apparatus for heating the cooling water, and may be disposed at and connected to the rear of the first cooling water pump 450 and the front of the heater core 440 in the flow direction of the cooling water. In addition, the cooling water heater 430 may be operated when a temperature of the cooling water is a specific temperature or less, and may be formed in various ways, such as an induction heater, a seed heater, a PTC heater, and a film heater that may generate heat using power.

The heater core 440 may be disposed in the air conditioner 150 of the vehicle, and the air flowing by the blower 152 may be heated through the heater core 440 and supplied to the interior of the vehicle to be used for heating the interior of the vehicle. In addition, the heater core 440 may be disposed at and connected to the rear of the cooling water heater 430 in the flow direction of the cooling water.

In addition, the air conditioner 150 may have a blower 152 installed on one side thereof to blow air, and a temperature control door 151 may be installed inside the air conditioner 150. In addition, the evaporator 242 and the heater core 440 disposed in the air conditioner may be disposed and configured so that the air discharged from the blower 152 according to the operation of the temperature control door 151 may pass through only the evaporator 242 and then be introduced into the interior, or may pass through the evaporator 242 and then pass through the heater core 440 to be introduced into the interior.

The first direction switching valve 410 may be installed between the heater core 440 and the first water-cooled condenser 220, and may be configured to selectively connect or disconnect the heating line 301-1 and a cooling line 301-2 to be described later. In more detail, the first direction switching valve 410 is installed on the heating line 301-1 so that two cooling water line pipes may be connected to the first direction switching valve 410, one first connection line 302-1 branched from one side of the cooling line 301-2 may be connected to the first direction switching valve 410, and one second connection line 302-2 branched from the other side of the cooling line 302 may be connected to the first direction switching valve 410. That is, four cooling water lines are connected to the first direction switching valve 410 so as to meet at the first direction switching valve 410, and the first direction switching valve 410 may be a four-way direction switching valve capable of adjusting a state in which the four cooling water lines are connected to or disconnected from each other.

On the first cooling line 301, the cooling line 301-2 may include a first radiator 310, a reservoir tank 370, a second direction switching valve 320, a second cooling water pump 420, a first direction switching valve 410, an electrical component 460, and a second cooling water joint 312.

The first radiator 310 is a heat exchanger that cools the cooling water heat-exchanged with the electrical component 460 or the battery 350, and may be cooled in an air-cooled manner by a cooling fan 311.

The reservoir tank 370 may serve to store the cooling water and supplement insufficient cooling water on the cooling water line, and may be installed on a cooling water line in the front of the second cooling water pump 420 and the third cooling water pump 340 in the flow direction of the cooling water.

The second direction switching valve 320 is installed on the cooling line 301-2 so that two cooling water pipes are connected to the second direction switching valve 320, and the first direction switching valve 410 and the second direction switching valve 320 may be connected to the first connection line 302-1 so that the heating line 301-1 and the cooling line 301-2 are connected. That is, three cooling water lines are connected to the second direction switching valve 320 so as to meet at the second direction switching valve 320, and the second direction switching valve 320 may be a three-way direction switching valve capable of adjusting a state in which the three cooling water lines are connected to or disconnected from each other.

The second cooling water pump 420 is a means for pumping the cooling water so that the cooling water is circulated along the cooling line 302. In addition, the second cooling water pump 420 is installed on the first connection line 302-1 between the first direction switching valve 410 and the second direction switching valve 320 such that the cooling water may flow from the second direction switching valve 320 toward the first direction switching valve 410 by an operation of the second cooling water pump 420.

The first direction switching valve 410 is the same as described in the heating line 301-1.

The electrical component 460 is disposed on a second connection line 302-2 connecting the first direction switching valve 410 and the second cooling water joint 312, and the electrical component 460 may be cooled by the cooling water. In addition, the electrical component 460 may be a driving motor, an inverter, an On Board Charger (OBC), or the like.

The second cooling water joint 312 may be installed at a point where a rear end of the second connection line 302-2 meets the cooling line 301-2, and three cooling water lines are connected so as to meet at the second cooling water joint 312. That is, the second cooling water joint 312 may be installed so that both sides thereof are connected on the cooling line 301-2, and the second connection line 302-2 may be connected to an upper side thereof.

The first chiller 252 is the same as described in the heating line 301-1.

In addition, the secondary refrigerant circulation system 500 may include a second compressor 510, a second water-cooled condenser 520, a fourth expansion valve 530, and a battery chiller 540.

The second compressor 510 may be an electrical compressor driven by being supplied with power, and serves to suck and compress the second refrigerant and discharge the sucked and compressed second refrigerant toward the second water-cooled condenser 520.

The second water-cooled condenser 520 serves to perform heat exchange between the second refrigerant discharged from the second compressor 510 and the cooling water flowing along the second connection line 302-2, condense the second refrigerant into a liquid refrigerant, and transfer the liquid refrigerant toward the fourth expansion valve 530.

The fourth expansion valve 530 may serve to throttle or bypass the refrigerant or block a flow of the refrigerant, and may be disposed at the rear of the second water-cooled condenser 520 in the flow direction of the refrigerant.

The battery chiller 540 may be disposed at the rear of the fourth expansion valve 530 in the flow direction of the refrigerant, and may be heat-exchanged with the cooling water to cool the cooling water flowing along the second cooling line 302.

In addition, the second cooling line 301-2 may include a third cooling water pump 340, a battery chiller 540, a battery 350, a third direction switching valve 330, and a first cooling water joint 313.

The third cooling water pump 340 is a means for pumping the cooling water so that the cooling water is circulated along the second cooling line 302. In addition, the third cooling water pump 340 is installed on a cooling water line in the front of the battery chiller 540 in the flow direction of the cooling water, such that the cooling water cooled in the battery chiller 540 by the operation of the third cooling water pump 340 may be supplied to the battery 350 to cool the battery 350.

The battery chiller 540 may be disposed on the cooling line between the third cooling water pump 340 and the battery chiller 540 to cool the cooling water flowing along the second cooling line 302.

The third direction switching valve 330 is installed on the cooling water line between the battery 350 and the second cooling water joint 312, and two cooling water pipes are connected to the third direction switching valve 330, and a third connection line 302-3 is connected to an upper side of the third direction switching valve 330, such that the battery 350 and the third connection line 302-3 may be connected in parallel. At this time, the second direction switching valve 320 may be a three-way direction switching valve capable of adjusting a state in which the three cooling water lines are connected to or disconnected from each other.

The first cooling water joint 313 is installed on a cooling water line of the rear of the second direction switching valve 320 in the flow direction of the cooling water, and the three cooling water lines are connected at the first cooling water joint 313 so as to meet. That is, the first cooling water joint 313 is installed so that both sides thereof are connected to the cooling line 301-2 and the second cooling line 302, and the third connection line 302-3 may be connected to a lower side thereof. Here, the third connection line 302-3 is a portion of the second cooling line 302.

Here, on the second connection line 302-2, the electrical component 460, the first chiller 252, and the second water-cooled condenser 520 may be sequentially disposed to be spaced apart from each other in the flow direction of the cooling water.

Hereinafter, operations according to operation modes of the thermal management system according to another embodiment of the present invention described above will be described.

1. Battery-Dedicated Cooling Mode (Upon Rapidly Charging Battery)

FIG. 6 is a configuration diagram illustrating an operating state in a battery-dedicated cooling mode of a thermal management system according to another embodiment of the present invention.

Referring to FIG. 6, the first compressor 210 operates in the primary refrigerant circulation system 200, and a high temperature and high pressure refrigerant is discharged from the first compressor 210. In addition, the refrigerant discharged from the first compressor 210 is cooled by being heat-exchanged with cooling water in the first water-cooled condenser 220. Subsequently, the refrigerant cooled in the first water-cooled condenser 220 passes through the first expansion valve 225 in a fully opened state and flows into the air-cooled condenser 230, and is cooled by being heat-exchanged with external air in the air-cooled condenser 230. That is, the first water-cooled condenser 220 and the air-cooled condenser 230 both serve as condensers to condense the refrigerant. The condensed refrigerant is then throttled while passing through the refrigerant branch portion 241 and the third expansion valve 251 to expand the refrigerant, and thereafter, the expanded refrigerant passes through the first chiller 252 and exchanges heat with the cooling water, and the refrigerant is evaporated and the cooling water is cooled. In addition, the refrigerant evaporated through the first chiller 252 passes through the accumulator 260 and flows into the first compressor 210 again. At this time, the second expansion valve 240 may be blocked so that the refrigerant may not flow to the evaporator 242. Thus, the refrigerant is circulated while repeating the above-described processes.

In addition, the second compressor 510 operates in the secondary refrigerant circulation system 500, and a high temperature and high pressure refrigerant is discharged from the second compressor 510. In addition, the refrigerant discharged from the second compressor 510 is cooled by being heat-exchanged with cooling water in the second water-cooled condenser 520. Subsequently, the refrigerant cooled in the second water-cooled condenser 520 is throttled and expanded while passing through the fourth expansion valve 540, and thereafter, the expanded refrigerant exchanges heat with the cooling water circulated along the second cooling line 302 while passing through the battery chiller 540 to cool the cooling water. In addition, a process in which the refrigerant that has passed through the battery chiller 540 is again introduced into the second compressor 510 and circulated is repeated.

Meanwhile, the cooling water of the first cooling line 301 of the cooling water circulation line 300 is circulated by the operation of the first cooling water pump 450 and the second cooling water pump 420. In addition, the refrigerant passing through the first water-cooled condenser 220, and the refrigerant passing through the electrical component 460 and the second water-cooled condenser 520 may be cooled by the cooling water, and the heated cooling water may be cooled by being heat-exchanged with external air by the operation of the cooling fan 311 in the first radiator 310. In addition, after passing through the electrical component 460, the cooling water may be cooled while passing through the first chiller 252.

At this time, the first direction switching valve 410 and the second direction switching valve 320 may be adjusted in a direction connecting the heating line 301-1 and the cooling line 301-2. In more detail, in the first direction switching valve 410, an upper side and a left side thereof may be connected to each other so that the cooling water may flow, and a lower side and a right side thereof may be connected to each other so that the cooling water may flow. In addition, in the second direction switching valve 320, a left side and a lower side thereof may be connected to each other so that the cooling water may flow, and a connection to a right side thereof may be blocked. In addition, in the third direction switching valve 330, an upper side and a right side thereof may be connected to each other and a left side thereof may be blocked.

As a result, a cycle in which the cooling water of the first cooling line 301 is circulated by passing through the reservoir tank 370, the second direction switching valve 320, the second cooling water pump 420, the first direction switching valve 410, the first water-cooled condenser 220, the first cooling water pump 450, the cooling water heater 430, the heater core 440, the first direction switching valve 410, the electrical component 460, the first chiller 252, the second water-cooled condenser 520, and the second cooling water joint 312 in sequence from the first radiator 310, and then flowing into the first radiator 310 again is repeated. Here, the cooling water may not flow from the second direction switching valve 320 to the first cooling water joint 313 by the second direction switching valve 320, and the cooling water may not flow from the third direction switching valve 330 to the second cooling water joint 312 by the third direction switching valve 330.

In addition, the cooling water of the second cooling line 302 is operated by the operation of the third cooling water pump 340, and a cycle in which the cooling water of the second cooling line 302 is circulated by passing through the battery chiller 540, the battery 350, the third direction switching valve 330, and the first cooling water joint 313 in sequence from the third cooling water pump 340 and flowing into the third cooling water pump 340 again is repeated. That is, the cooling line is formed as a separate closed loop through which the cooling water is circulated by the second direction switching valve 320 and the third direction switching valve 330 so that the battery 350 may be separately cooled.

Here, the battery-dedicated cooling mode may be operated when rapid charging of the battery is required without cooling the interior. In this case, the first compressor 210 may be rotated at 2,000 rpm and the second compressor 510 may be rotated at 8,000 rpm.

2. Maximum Cooling Mode

Figure 7:
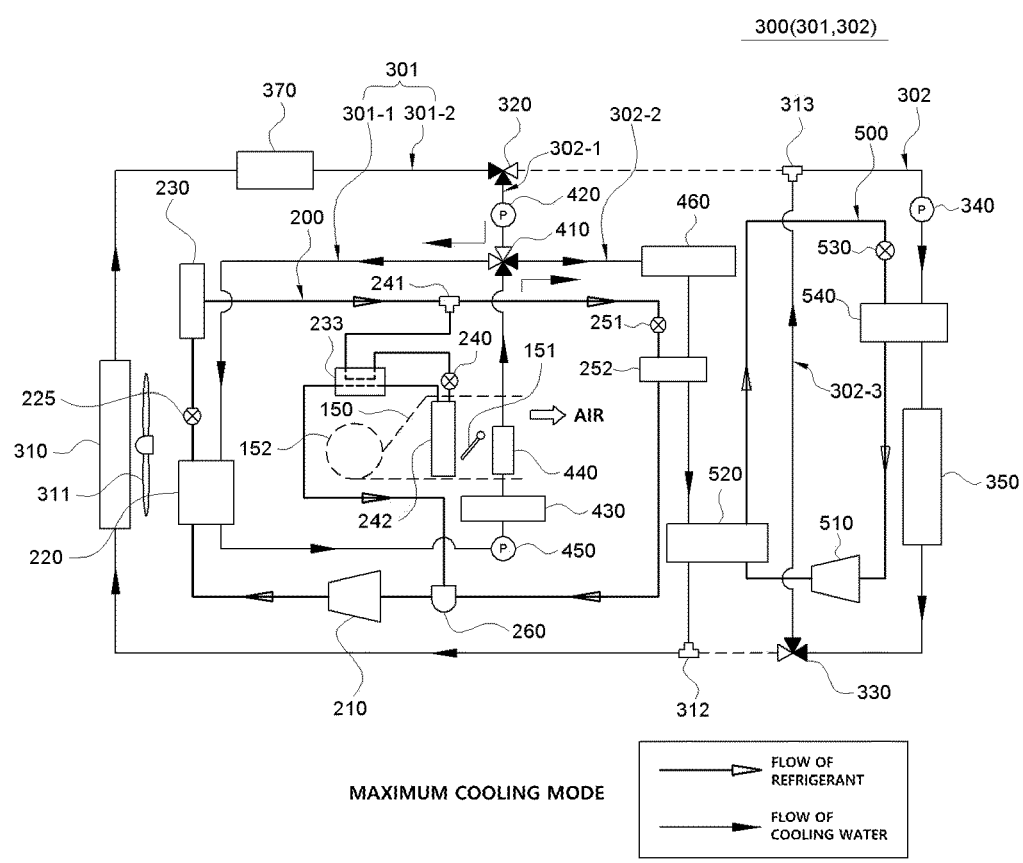
FIG. 7 is a configuration diagram illustrating an operating state in a maximum cooling mode of the thermal management system according to another embodiment of the present invention.

FIG. 7 is a configuration diagram illustrating an operating state in a maximum cooling mode of the thermal management system according to another embodiment of the present invention.

Referring to FIG. 7, the first compressor 210 operates in the primary refrigerant circulation system 200, and a high temperature and high pressure refrigerant is discharged from the first compressor 210. In addition, the refrigerant discharged from the first compressor 210 is cooled by being heat-exchanged with cooling water in the first water-cooled condenser 220. Subsequently, the refrigerant cooled in the first water-cooled condenser 220 passes through the first expansion valve 225 in a fully opened state and flows into the air-cooled condenser 230, and is cooled by being heat-exchanged with external air in the air-cooled condenser 230. That is, the first water-cooled condenser 220 and the air-cooled condenser 230 both serve as condensers to condense the refrigerant. The condensed refrigerant is then branched from the refrigerant branch portion 241 so that a part of the refrigerant passes through the refrigerant heat exchanger 233 and then passes through the second expansion valve 240 and is throttled to expand the refrigerant, and thereafter, the expanded refrigerant passes through the evaporator 242 and exchanges heat with the air blown by the blower 152 of the air conditioner 150 to evaporate the refrigerant to cool the air, such that the cooled air is supplied to the interior of the vehicle to achieve the cooling of the interior. In addition, the refrigerant evaporated in the evaporator 242 passes through the refrigerant heat exchanger 233 and exchanges heat with the refrigerant before flowing into the second expansion valve 240 and then flows into the first compressor 210 again through the accumulator 260. In addition, the rest of the refrigerant branched from the refrigerant branch portion 241 is throttled while passing through the third expansion valve 251 to expand the refrigerant, and thereafter, the expanded refrigerant passes through the first chiller 252 and exchanges heat with the cooling water so that the refrigerant may be evaporated to cool the cooling water. In addition, the refrigerant evaporated through the first chiller 252 passes through the accumulator 260 and flows into the first compressor 210 again. In this way, the refrigerant that has passed through the evaporator 242 and the refrigerant that has passed through the chiller 252 are joined at the accumulator 260 and flow into the compressor 210, and the refrigerant is then circulated while repeating the above-described processes.

In addition, the second compressor 510 operates in the secondary refrigerant circulation system 500, and a high temperature and high pressure refrigerant is discharged from the second compressor 510. In addition, the refrigerant discharged from the second compressor 510 is cooled by being heat-exchanged with cooling water in the second water-cooled condenser 520. Subsequently, the refrigerant cooled in the second water-cooled condenser 520 is throttled and expanded while passing through the fourth expansion valve 540, and thereafter, the expanded refrigerant exchanges heat with the cooling water circulated along the second cooling line 302 while passing through the battery chiller 540 to cool the cooling water. In addition, a process in which the refrigerant that has passed through the battery chiller 540 is again introduced into the second compressor 510 and circulated is repeated.

Meanwhile, the cooling water of the first cooling line 301 of the cooling water circulation line 300 is circulated by the operation of the first cooling water pump 450, the second cooling water pump 420, and the third cooling water pump 340. In addition, the refrigerant passing through the first water-cooled condenser 220, and the refrigerant passing through the electrical component 460 and the second water-cooled condenser 520 may be cooled by the cooling water, and the heated cooling water may be cooled by being heat-exchanged with external air by the operation of the cooling fan 311 in the first radiator 310. In addition, after passing through the electrical component 460, the cooling water is cooled while passing through the first chiller 252, and the cooling water cooled by the first chiller 252 cools the refrigerant circulated along the second cooling line 302 while passing through the second water-cooled condenser 520.

At this time, the first direction switching valve 410 and the second direction switching valve 320 may be adjusted in a direction connecting the heating line 301-1 and the cooling line 301-2. In more detail, in the first direction switching valve 410, an upper side and a left side thereof may be connected to each other so that the cooling water may flow, and a lower side and a right side thereof may be connected to each other so that the cooling water may flow. In addition, in the second direction switching valve 320, a left side and a lower side thereof may be connected to each other so that the cooling water may flow, and a connection to a right side thereof may be blocked. In addition, in the third direction switching valve 330, an upper side and a right side thereof may be connected to each other and a left side thereof may be blocked.

As a result, a cycle in which the cooling water of the first cooling line 301 is circulated by being passed through the reservoir tank 370, the second direction switching valve 320, the second cooling water pump 420, the first direction switching valve 410, the first water-cooled condenser 220, the first cooling water pump 450, the cooling water heater 430, the heater core 440, the first direction switching valve 410, the electrical component 460, the first chiller 252, the second water-cooled condenser 520, and the second cooling water joint 312 in sequence from the first radiator 310, and then flowing into the first radiator 310 again is repeated. Here, the cooling water may not flow from the second direction switching valve 320 to the first cooling water joint 313 by the second direction switching valve 320, and the cooling water may not flow from the third direction switching valve 330 to the second cooling water joint 312 by the third direction switching valve 330.

In addition, a cycle in which the cooling water of the second cooling line 302 is circulated by passing through the battery chiller 540, the battery 350, the third direction switching valve 330, and the first cooling water joint 313 in sequence from the third cooling water pump 340 and flowing into the third cooling water pump 340 again is repeated. That is, the cooling line is formed as a separate closed loop through which the cooling water is circulated by the second direction switching valve 320 and the third direction switching valve 330 so that the battery 350 may be separately cooled.

Here, the maximum cooling mode may be operated when a temperature of the external air is in the range of 30 to 45 degrees Celsius, and at this time, the first compressor 210 and the second compressor 510 may be rotated at a maximum rotational speed, respectively. In addition, when the cooling of the battery 350 is not necessary, the third expansion valve 251 is blocked so that the refrigerant may not flow toward the first chiller 252. At this time, the third cooling water pump 340 may not operate, and the secondary refrigerant circulation system 500 may also not operate.

3. Mild Cooling Mode

Figure 8:
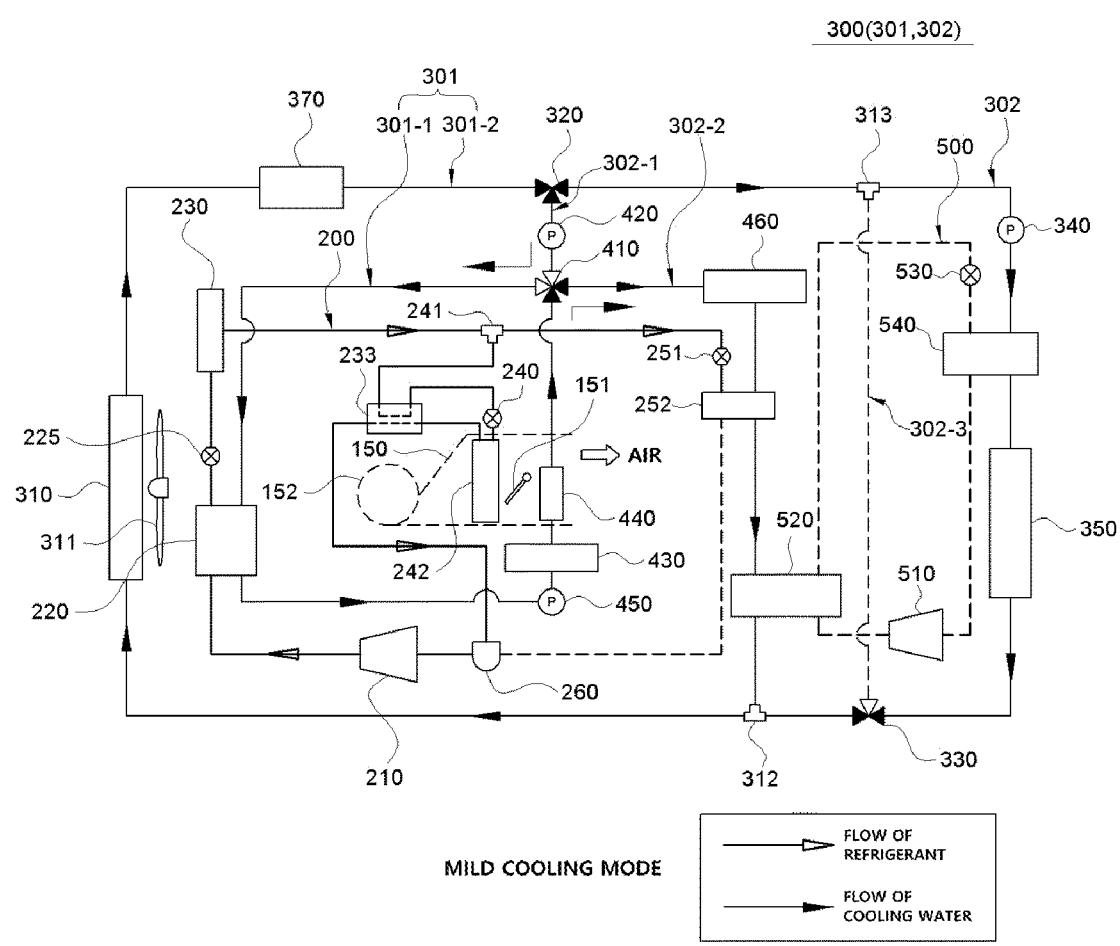
FIG. 8 is a configuration diagram illustrating an operating state in a mild cooling mode of the thermal management system according to another embodiment of the present invention.

FIG. 8 is a configuration diagram illustrating an operating state in a mild cooling mode of the thermal management system according to another embodiment of the present invention.

Referring to FIG. 8, the first compressor 210 operates in the primary refrigerant circulation system 200, and a high temperature and high pressure refrigerant is discharged from the first compressor 210. In addition, the refrigerant discharged from the first compressor 210 is cooled by being heat-exchanged with cooling water in the first water-cooled condenser 220. Subsequently, the refrigerant cooled in the first water-cooled condenser 220 passes through the first expansion valve 225 in a fully opened state and flows into the air-cooled condenser 230, and is cooled by being heat-exchanged with external air in the air-cooled condenser 230. That is, the first water-cooled condenser 220 and the air-cooled condenser 230 both serve as condensers to condense the refrigerant. The condensed refrigerant is then branched from the refrigerant branch portion 241 so that a part of the refrigerant passes through the refrigerant heat exchanger 233 and then passes through the second expansion valve 240 and is throttled to expand the refrigerant, and thereafter, the expanded refrigerant passes through the evaporator 242 and exchanges heat with the air blown by the blower 152 of the air conditioner 150 to evaporate the refrigerant to cool the air, such that the cooled air is supplied to the interior of the vehicle to achieve the cooling of the interior. In addition, the refrigerant evaporated in the evaporator 242 passes through the refrigerant heat exchanger 233 and exchanges heat with the refrigerant before flowing into the second expansion valve 240 and then flows into the first compressor 210 again through the accumulator 260. At this time, the third expansion valve 251 may be blocked so that the refrigerant may not flow to the first chiller 252. Thus, after the refrigerant that passed through the evaporator 242 passes through the accumulator 260 and flows into the first compressor 210, the refrigerant is circulated while repeating the above-described processes.

In addition, in the secondary refrigerant circulation system 500, the second compressor 510 does not operate, so that the refrigerant may not flow.

Meanwhile, the cooling water of the cooling water circulation line 300 is circulated by the operation of the first cooling water pump 450, the second cooling water pump 420, and the third cooling water pump 340. In addition, the refrigerant passing through the first water-cooled condenser 220, the electrical component 460, and the battery 350 may be cooled by the cooling water, and the heated cooling water may be cooled by being heat-exchanged with external air by the operation of the cooling fan 311 in the first radiator 310. At this time, the first direction switching valve 410 and the second direction switching valve 320 may be adjusted in a direction connecting the heating line 301-1 and the cooling line 301-2 of the first cooling line 301, and the second direction switching valve 320 and the third direction switching valve 330 may be adjusted in a direction connecting the first cooling line 301 and the second cooling line 302. In more detail, in the first direction switching valve 410, an upper side and a left side thereof may be connected to each other so that the cooling water may flow, and a lower side and a right side thereof may be connected to each other so that the cooling water may flow. In addition, in the second direction switching valve 320, the left, lower and right sides of the three directions are all connected so that the cooling water may flow. In addition, in the third direction switching valve 330, the left aide and the right side thereof may be connected to each other and an upper side thereof may be blocked.

As a result, a cycle in which the cooling water is circulated by passing through the reservoir tank 370, the second direction switching valve 320, the second cooling water pump 420, the first direction switching valve 410, the water-cooled condenser 220, the first cooling water pump 450, the cooling water heater 430, the heater core 440, the first direction switching valve 410, the electrical component 460, the first chiller 252, the second water-cooled condenser 520, and the second cooling water joint 312 in sequence from the first radiator 310, and then flowing into the first radiator 310 again is repeated. Here, a cycle in which a part of the cooling water is circulated by flowing to the right side by the second direction switching valve 320, passing through the first cooling water joint 313, the third cooling water pump 340, the battery chiller 540, the battery 350, the third direction switching valve 330, and the second cooling water joint 312 in sequence, and flowing into the first radiator 310 again is repeated. At this time, the cooling water that has passed through the electrical component 460 and the cooling water that has passed through the battery 350 may be joined at the second cooling water joint 312 and flow into the first radiator 310. In addition, the cooling water may not flow through the third connection line 302-3 by the third direction switching valve 330.

Here, the mild cooling mode may be operated when the temperature of the external air is in the range of 15 to 25 degrees Celsius, and at this time, since the battery may be cooled by the first radiator, the refrigerant may be prevented from circulating through the first chiller 252 of the primary refrigerant circulation system 200, and the secondary refrigerant circulation system 500 may also not operate, the power consumed for driving the compressor may be reduced.

4. Maximum Heating Mode

Figure 9:
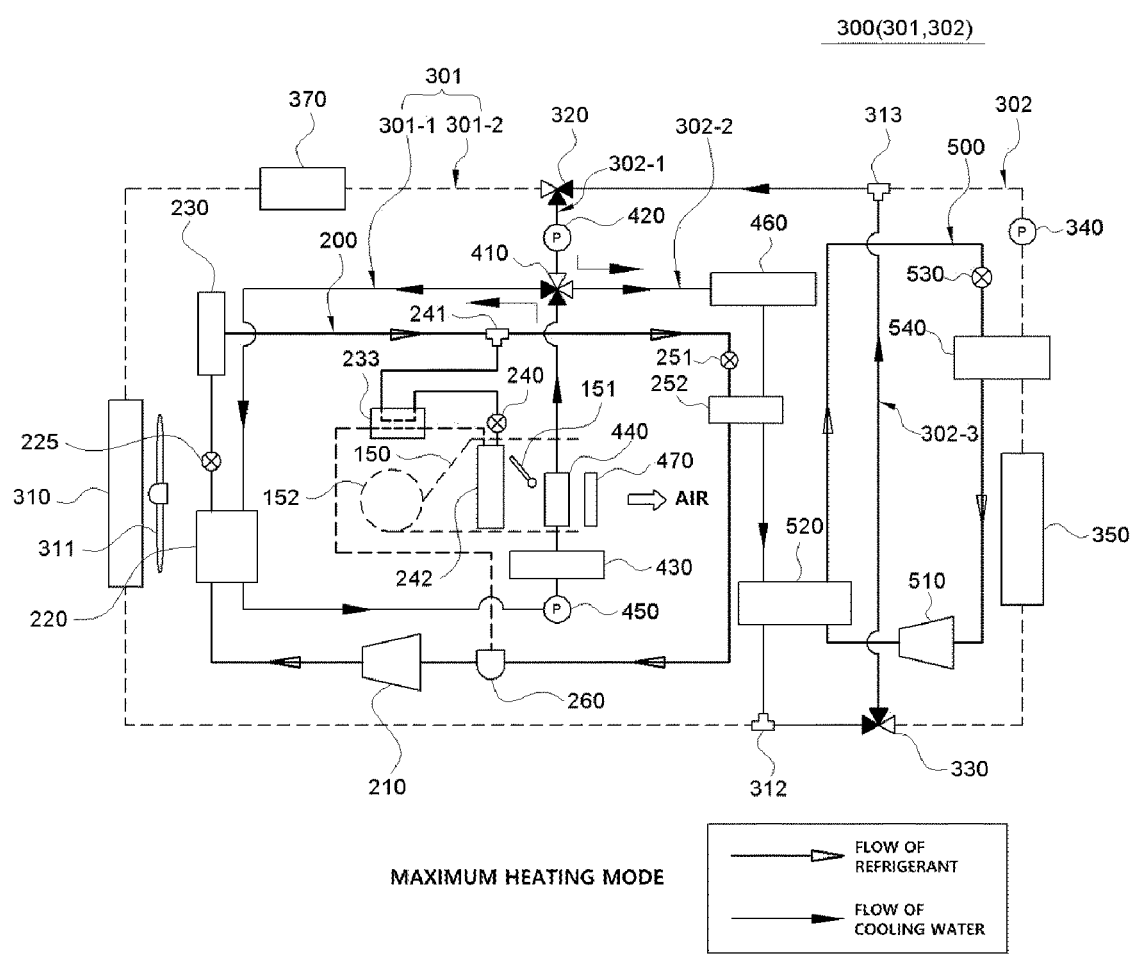
FIG. 9 is a configuration diagram illustrating an operating state in a maximum heating mode of the thermal management system according to another embodiment of the present invention.

FIG. 9 is a configuration diagram illustrating an operating state in a maximum heating mode of the thermal management system according to an embodiment of the present invention.

Referring to FIG. 9, the first compressor 210 operates in the primary refrigerant circulation system 200, and a high temperature and high pressure refrigerant is discharged from the first compressor 210. In addition, the refrigerant discharged from the first compressor 210 is cooled by being heat-exchanged with cooling water in the first water-cooled condenser 220. Subsequently, the refrigerant cooled in the first water-cooled condenser 220 is throttled and expanded while passing through the first expansion valve 225, and the expanded refrigerant exchanges heat with external air while passing through the air-cooled condenser 230, and absorbs heat from the external air while the refrigerant evaporates. Subsequently, the refrigerant passes through the refrigerant branch portion 241, passes through the third expansion valve 251 in a fully opened state, and flows into the first chiller 252, and in the first chiller 252, the refrigerant may be heated by heat-exchange between the refrigerant and the cooling water. Then, the refrigerant that has passed through the first chiller 252 passes through the accumulator 260 and flows into the first compressor 210 again. At this time, the second expansion valve 240 may be blocked so that the refrigerant may not flow to the evaporator 242. Thus, the refrigerant is circulated while repeating the above-described processes.

In addition, the second compressor 510 operates in the secondary refrigerant circulation system 500, and a high temperature and high pressure refrigerant is discharged from the second compressor 510. In addition, the refrigerant discharged from the second compressor 510 is cooled by being heat-exchanged with cooling water in the second water-cooled condenser 520. Subsequently, the refrigerant cooled in the second water-cooled condenser 520 passes through the fourth expansion valve 540 in a fully opened state and flows into the battery chiller 540, and thereafter, a cycle in which the refrigerant that has passed through the battery chiller 540 flows into the second compressor 510 and circulated may be repeated. Alternatively, in the secondary refrigerant circulation system 500, the second compressor 510 does not operate, so that the refrigerant may not flow.

Meanwhile, the cooling water of the cooling water circulation line 300 is circulated by the operation of the first cooling water pump 450 and the second cooling water pump 420. In addition, the cooling water may be heated while passing through the first water-cooled condenser 220, may be heated by the cooling water heater 430, may be heated by waste heat of the electrical component 460, and may be cooled while passing through the first chiller 252. At this time, the first direction switching valve 410, the second direction switching valve 320, and the third direction switching valve 330 may be adjusted in a direction disconnecting the heating line 301-1 and the cooling line 301-2 of the first cooling line 301, and may be adjusted in a direction connecting the first cooling line 301 and the second cooling line 302. In more detail, in the first direction switching valve 410, an upper side and a right side thereof may be connected to each other so that the cooling water may flow, and a lower side and a left side thereof may be connected to each other so that the cooling water may flow. In addition, in the second direction switching valve 320, a right side and a lower side thereof may be connected to each other so that the cooling water may flow, and a connection to a left side thereof may be blocked. In addition, in the third direction switching valve 330, an upper side and a left side thereof may be connected to each other and a right side thereof may be blocked.

As a result, a cycle in which the cooling water of the heating line 301-1 is circulated by passing through the first cooling water pump 450, the cooling water heater 430, the heater core 440, the first direction switching valve 410, and the first water-cooled condenser 220 in sequence and flowing into the first cooling water pump 450 again is repeated. In addition, a cycle in which the cooling water of the cooling line 301-2 disconnected from the heating line 301-1 is circulated by passing through the first direction switching valve 410, the electrical component 460, the first chiller 252, the second water-cooled condenser 520, the second cooling water joint 312, the third direction switching valve 330, the first cooling water joint 313, and the second direction switching valve 320 in sequence from the second cooling water pump 420 and flowing into the second cooling water pump 420 again is repeated. Here, the cooling water may not flow from the second direction switching valve 320 to the second cooling water joint 312 through the first radiator 310 by the second direction switching valve 320, and the cooling water may not flow from the third direction switching valve 330 to the first cooling water joint 313 through the battery 350, the battery chiller 540, and the third cooling water pump 340 by the third direction switching valve 330. In addition, the air is heated by being heat-exchanged with the air blown by the blower 152 of the air conditioner 150 while passing through the heater core 440, the interior heating is achieved by supplying the heated air to the interior of the vehicle.

In addition, the thermal management system according to the present invention may further include an air heating type heater that is configured separately from the heating line 301-1 and directly heats air flowing into the interior to heat the interior. That is, the air heating type heater may be provided in proximity to the heater core 440, and may be formed of, for example, a PTC heater operated by electricity and having a relatively small heating capacity to rapidly heat air. Thus, it is possible to increase a quick effect of interior heating.

Here, the maximum heating mode may be operated when the temperature of the external air is in the range of −20 degrees Celsius to −5 degrees Celsius, and may cool battery 350 by controlling the third direction switching valve 330 and the third cooling water pump 340.

5. Mild Heating Mode

Figure 10:
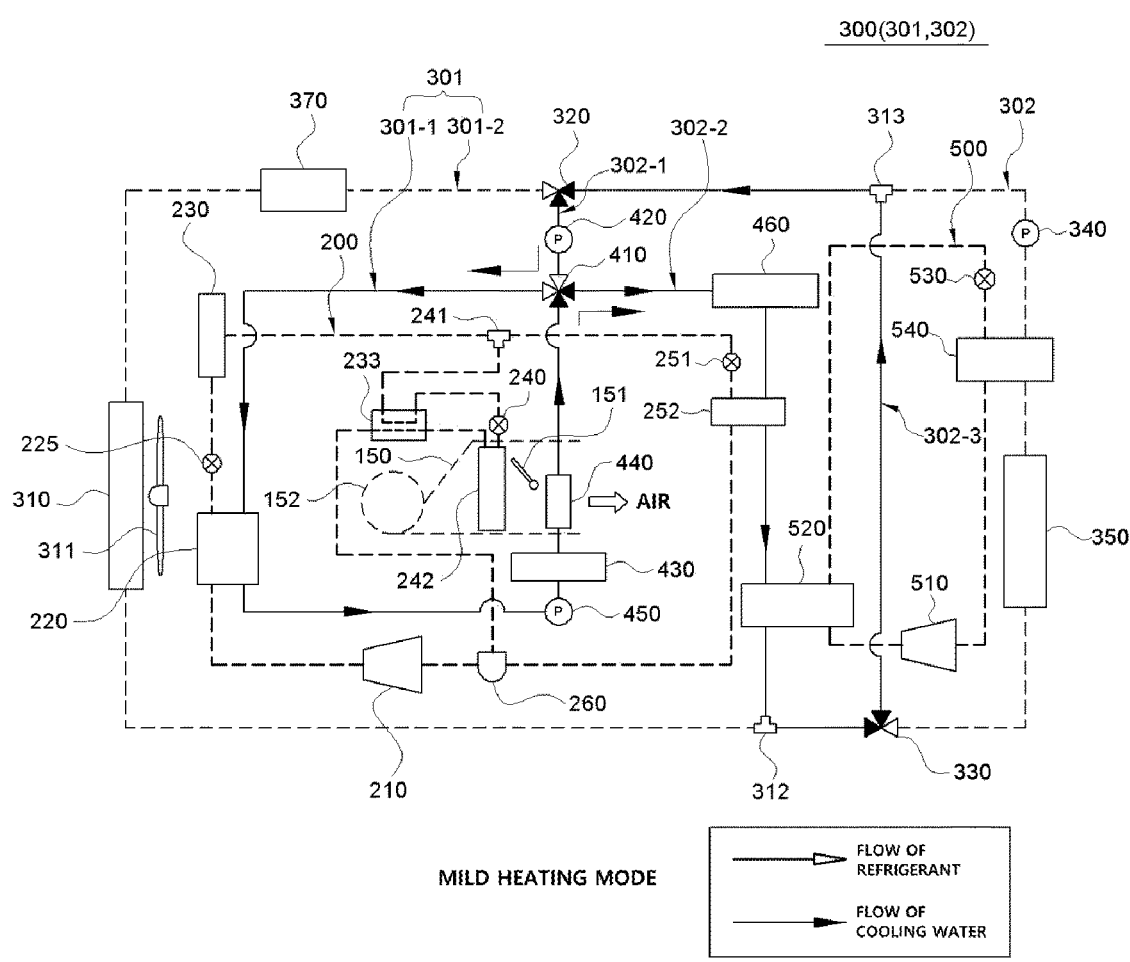
FIG. 10 is a configuration diagram illustrating an operating state in a mild heating mode of the thermal management system according to another embodiment of the present invention.

FIG. 10 is a configuration diagram illustrating an operating state in a mild heating mode of the thermal management system according to another embodiment of the present invention.

Referring to FIG. 10, the primary refrigerant circulation system 200 and the secondary refrigerant circulation system 500 do not operate and the refrigerant is not circulated.

Meanwhile, the cooling water of the cooling water circulation line 300 is circulated by the operation of the first cooling water pump 450 and the second cooling water pump 420. In addition, the cooling water may be heated only by waste heat of the electrical component 460. At this time, the first direction switching valve 410, the second direction switching valve 320, and the third direction switching valve 330 may be adjusted in a direction connecting the heating line 301-1 and the cooling line 301-2 of the first cooling line 301, and may be adjusted in a direction connecting the first cooling line 301 and the second cooling line 302. In more detail, in the first direction switching valve 410, an upper side and a left side thereof may be connected to each other so that the cooling water may flow, and a lower side and a right side thereof may be connected to each other so that the cooling water may flow. In addition, in the second direction switching valve 320, a right side and a lower side thereof may be connected to each other so that the cooling water may flow, and a connection to a left side thereof may be blocked. In addition, in the third direction switching valve 330, a left side and an upper side thereof may be connected to each other and a right side thereof may be blocked.

As a result, a cycle in which the cooling water is circulated by passing through the first direction switching valve 410, the first water-cooled condenser 220, the first cooling water pump 450, the cooling water heater 430, the heater core 440, the first direction switching valve 410, the electrical component 460, the first chiller 252, second water-cooled condenser 520, the second cooling water joint 312, the third direction switching valve 330, the first cooling water joint 313, and the second direction switching valve 320 in sequence from the second cooling water pump 420, and then flowing into the second cooling water pump 420 again is repeated. At this time, the cooling water may not flow from the third direction switching valve 330 to the battery 350, the battery chiller 540, the third cooling water pump 340, and the first cooling water joint 313 by the third direction switching valve 330, and the cooling water may not flow from the second direction switching valve 320 to the second cooling water joint 312 through the first radiator 310 by the second direction switching valve 320. Thus, when the demand for heating is low, the cooling water may be heated using only the waste heat of the electrical component 460 and used for interior heating.

Here, the mild heating mode may be operated when the temperature of the external air is in the range of 5 degrees Celsius to 15 degrees Celsius.

6. Dehumidifying and Heating Mode

Figure 11:
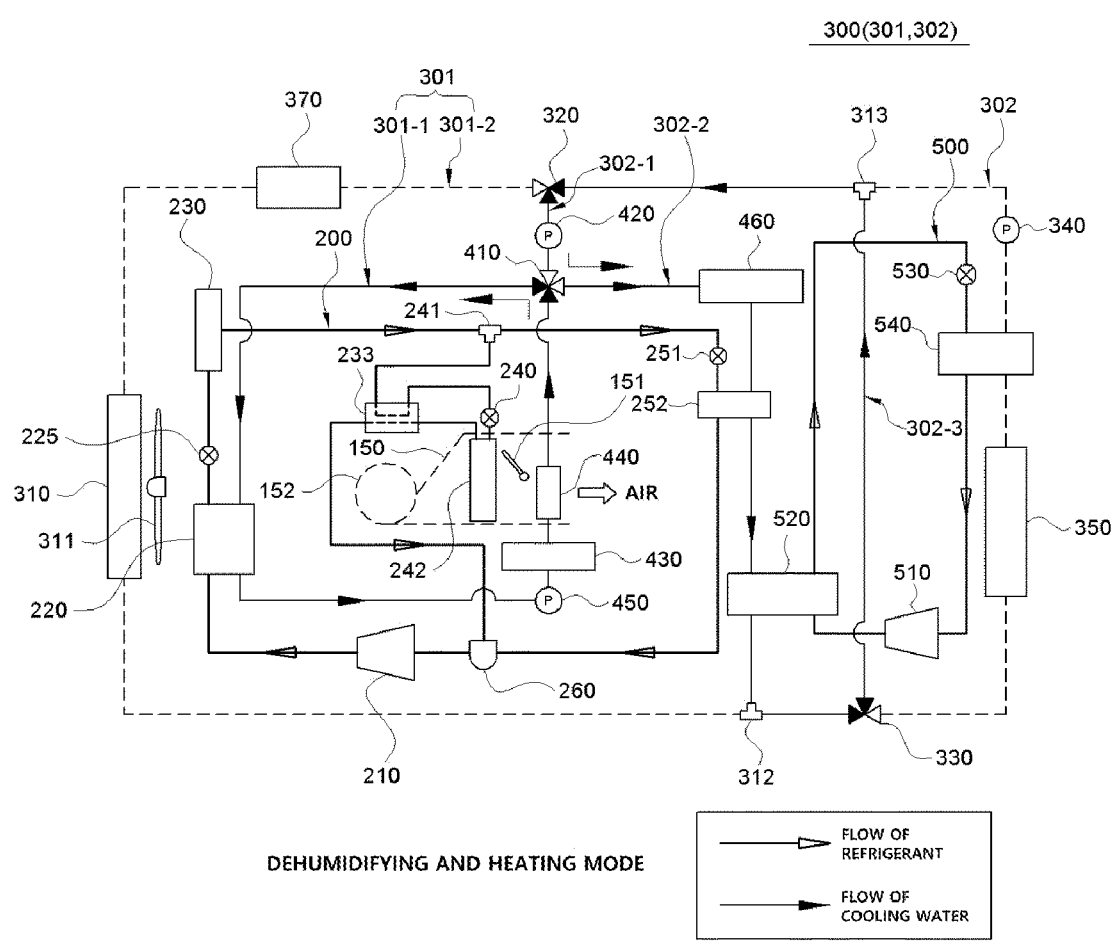
FIG. 11 is a configuration diagram illustrating an operating state in a dehumidifying and heating mode of the thermal management system according to another embodiment of the present invention.

FIG. 11 is a configuration diagram illustrating an operating state in a dehumidifying and heating mode of the heat management system according to an embodiment of the present invention.

Referring to FIG. 11, the first compressor 210 operates in the primary refrigerant circulation system 200, and a high temperature and high pressure refrigerant is discharged from the first compressor 210. In addition, the refrigerant discharged from the first compressor 210 is cooled by being heat-exchanged with cooling water in the first water-cooled condenser 220. Subsequently, the refrigerant cooled in the first water-cooled condenser 220 is throttled while passing through the first expansion valve 225 to expand the refrigerant, the expanded refrigerant passes through the air-cooled condenser 230 and is branched at the branch portion 241 so that a part of the refrigerant passes through the refrigerant heat exchanger 233 and then bypasses the second expansion valve 240, and thereafter, the refrigerant passes through the evaporator 242 and exchanges heat with the air blown by the blower 152 of the air conditioner 150 to remove moisture in the air. In addition, the refrigerant that has passed through the evaporator 242 passes through the refrigerant heat exchanger 233, passes through the accumulator 260, and flows into the first compressor 210 again. In addition, the rest of the refrigerant branched from the refrigerant branch portion 241 bypasses the third expansion valve 240, and thereafter, the refrigerant passes through the first chiller 252, is then joined at the accumulator 260, and flows into the first compressor 210, and the refrigerant is circulated while repeating the above-described processes.

In addition, the second compressor 510 operates in the secondary refrigerant circulation system 500, and a high temperature and high pressure refrigerant is discharged from the second compressor 510. In addition, the refrigerant discharged from the second compressor 510 is cooled by being heat-exchanged with cooling water in the second water-cooled condenser 520. Subsequently, the refrigerant cooled in the second water-cooled condenser 520 passes through the fourth expansion valve 540 in a fully opened state and flows into the battery chiller 540, and thereafter, a cycle in which the refrigerant that has passed through the battery chiller 540 flows into the second compressor 510 and circulated may be repeated. Alternatively, in the secondary refrigerant circulation system 500, the second compressor 510 does not operate, so that the refrigerant may not flow.

Meanwhile, the cooling water of the cooling water circulation line 300 is circulated by the operation of the first cooling water pump 450 and the second cooling water pump 420. In addition, the cooling water may be heated while passing through the first water-cooled condenser 220, may be heated by the cooling water heater 430, may be heated by waste heat of the electrical component 460, and may be cooled while passing through the first chiller 252. At this time, the first direction switching valve 410, the second direction switching valve 320, and the third direction switching valve 330 may be adjusted in a direction disconnecting the heating line 301-1 and the cooling line 301-2 of the first cooling line 301, and may be adjusted in a direction connecting the first cooling line 301 and the second cooling line 302. In more detail, in the first direction switching valve 410, an upper side and a right side thereof may be connected to each other so that the cooling water may flow, and a lower side and a left side thereof may be connected to each other so that the cooling water may flow. In addition, in the second direction switching valve 320, a right side and a lower side thereof may be connected to each other so that the cooling water may flow, and a connection to a left side thereof may be blocked. In addition, in the third direction switching valve 330, an upper side and a left side thereof may be connected to each other and a right side thereof may be blocked.

As a result, a cycle in which the cooling water of the heating line 301-1 is circulated by passing through the first cooling water pump 450, the cooling water heater 430, the heater core 440, the first direction switching valve 410, and the first water-cooled condenser 220 in sequence and flowing into the first cooling water pump 450 again is repeated. In addition, a cycle in which the cooling water of the cooling line 301-2 disconnected from the heating line 301-1 is circulated by passing through the first direction switching valve 410, the electrical component 460, the first chiller 252, the second water-cooled condenser 520, the second cooling water joint 312, the third direction switching valve 330, the first cooling water joint 313, and the second direction switching valve 320 in sequence from the second cooling water pump 420 and flowing into the second cooling water pump 420 again is repeated. Here, the cooling water may not flow from the second direction switching valve 320 to the second cooling water joint 312 through the first radiator 310 by the second direction switching valve 320, and the cooling water may not flow from the third direction switching valve 330 to the first cooling water joint 313 through the battery 350, the battery chiller 540, and the third cooling water pump 340 by the third direction switching valve 330. In addition, the air is heated by being heat-exchanged with the air blown by the blower 152 of the air conditioner 150 while passing through the heater core 440, the interior heating is achieved by supplying the heated air to the interior of the vehicle. Here, the cooling water heater 430 may not be operated, and the air dehumidified while passing through the evaporator 242 is heated while passing through the heater core 440 and may be used for interior heating.

Here, the dehumidification heating mode may be operated when the temperature of the external air is in the range of 5 degrees Celsius to 15 degrees Celsius.

7. Battery Heating Mode

Figure 12:
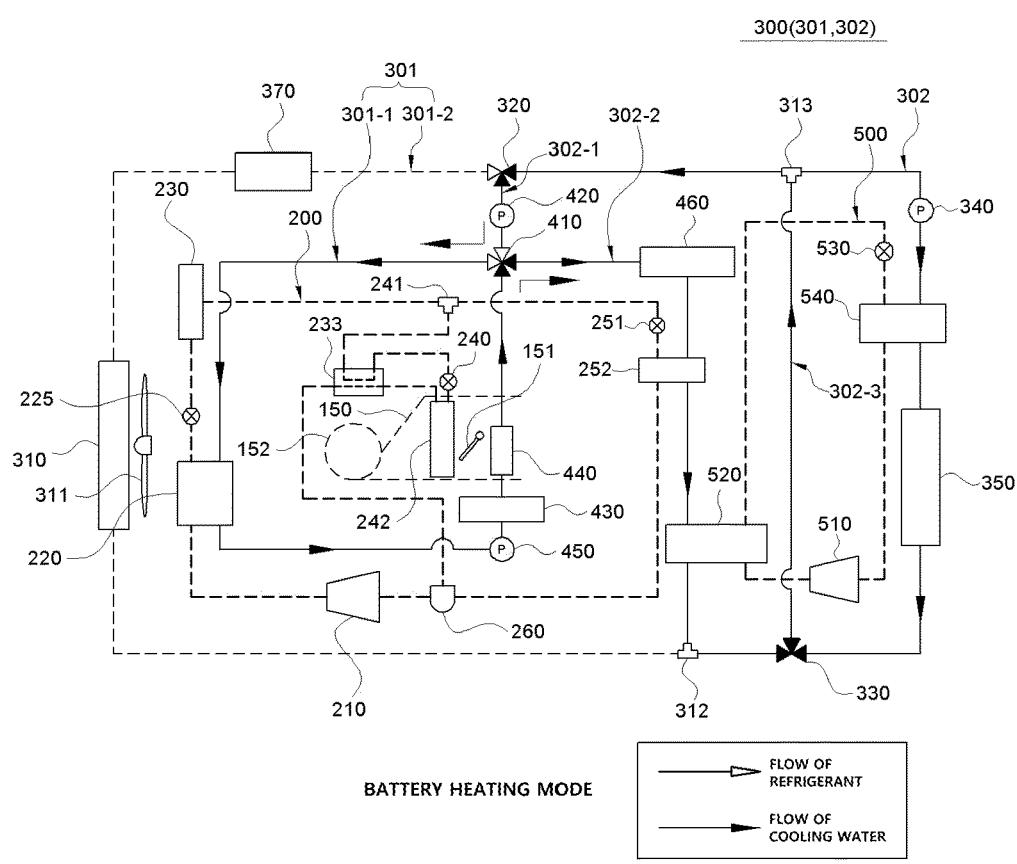
FIG. 12 is a configuration diagram illustrating an operating state in a battery heating mode of the thermal management system according to another embodiment of the present invention.

FIG. 12 is a configuration diagram illustrating an operating state in a battery heating mode of the thermal management system according to another embodiment of the present invention.

Referring to FIG. 12, the primary refrigerant circulation system 200 and the secondary refrigerant circulation system 500 do not operate and the refrigerant is not circulated.

Meanwhile, the cooling water of the cooling water circulation line 300 is circulated by the operation of the first cooling water pump 450, the second cooling water pump 420, and the third cooling water pump 340. In addition, the cooling water may be heated by waste heat of the cooling water heater 430 and the electrical component 460. At this time, the first direction switching valve 410, the second direction switching valve 320, and the third direction switching valve 330 may be adjusted in a direction connecting the heating line 301-1 and the cooling line 301-2 of the first cooling line 301, and may be adjusted in a direction connecting the first cooling line 301 and the second cooling line 302. In more detail, in the first direction switching valve 410, an upper side and a left side thereof may be connected to each other so that the cooling water may flow, and a lower side and a right side thereof may be connected to each other so that the cooling water may flow. In addition, in the second direction switching valve 320, a right side and a lower side thereof may be connected to each other so that the cooling water may flow, and a connection to a left side thereof may be blocked. In addition, in the third direction switching valve 330, the left, upper, and right sides are all connected.

As a result, a cycle in which the cooling water is circulated by passing through the first direction switching valve 410, the first water-cooled condenser 220, the first cooling water pump 450, the cooling water heater 430, the heater core 440, the first direction switching valve 410, the electrical component 460, the first chiller 252, second water-cooled condenser 520, the second cooling water joint 312, the third direction switching valve 330, the first cooling water joint 313, and the second direction switching valve 320 in sequence from the second cooling water pump 420, and then flowing into the second cooling water pump 420 again is repeated. At this time, the cooling water passing through the battery 350 may be joined at the third direction switching valve 330 and heated, and flow upward and then branched to both sides at the first cooling water joint 313. As a result, a circulation process in which the cooling water branched to the right side at the first cooling water joint 313 flows into the battery 350 through the third cooling water pump 340 and the battery chiller 540 may be repeated. Here, the cooling water may not flow from the second direction switching valve 320 to the second cooling water joint 312 through the first radiator 310 by the second direction switching valve 320. Thus, the heated cooling water raises the temperature of the battery 350, so that an initial performance of the battery 350 may be quickly improved in the winter in which the outside temperature is low.

Here, the battery heating mode may be operated when the temperature of the external air is in the range of −20 degrees Celsius to −5 degrees Celsius.

The present invention is not limited to the above-described embodiments, and may be variously applied. In addition, the present invention may be variously modified by those skilled in the art to which the present invention pertains without departing from the spirit of the present invention claimed in the claims.

DESCRIPTION OF REFERENCE NUMERALS

150: air conditioner, 151: temperature control door
152: blower
200: primary refrigerant circulation system, 210: first compressor
220: first water-cooled condenser, 225: first expansion valve
230: air-cooled condenser, 233: refrigerant heat exchanger
240: second expansion valve, 241: refrigerant branch portion
242: evaporator, 251: third expansion valve
252: first chiller, 260: accumulator
300: cooling water circulation line, 301: first cooling line
301-1: heating line, 301-2: cooling line
302: second cooling line, 303: third cooling line
302-1: first connection line, 302-2: second connection line
302-3: third connection line, 310: first radiator
311: cooling fan, 312: second cooling water joint
313: first cooling water joint, 320: second direction switching valve
330: third direction switching valve, 340: third cooling water pump
350: battery, 370: reservoir tank
380: second radiator
410: first direction switching valve, 420: second cooling water pump
430: cooling water heater, 440: heater core
450: first cooling water pump, 460: electrical component
500: secondary refrigerant circulation system, 510: second compressor
520: second water-cooled condenser, 530: fourth expansion valve
540: battery chiller

The invention claimed is:

1. A thermal management system comprising:
a primary refrigerant circulation system that circulates a first refrigerant for air conditioning of an interior of a vehicle; and
a secondary refrigerant circulation system that exchanges heat with the first refrigerant and circulates a second refrigerant to cool a battery,
wherein the first refrigerant and the second refrigerant exchange the heat through cooling water;
wherein each of the primary refrigerant circulation system and the secondary refrigerant circulation system includes a compressor, a condenser, an expansion valve, and a chiller, and in a battery-dedicated cooling mode, the compressor of the secondary refrigerant circulation system has a higher rotational speed (RPM) than that of the compressor of the primary refrigerant circulation system;

a first cooling line through which a first cooling water that cools the first refrigerant at the condenser of the primary refrigerant circulation system is circulated; and a second cooling line that cools the battery by circulating a second cooling water heat-exchanged through the chiller of the secondary refrigerant circulation system.

2. The thermal management system as claimed in claim 1, wherein a ratio of the rotational speed (RPM) between the compressor of the primary refrigerant circulation system and the compressor of the secondary refrigerant circulation system is 1:4.

3. The thermal management system as claimed in claim 1, further comprising:

a third cooling line that exchanges heat between the first refrigerant and the second refrigerant using the cooling water as a medium, wherein the third cooling line further comprises a third radiator for cooling the cooling water with air.

4. The thermal management system as claimed in claim 1, wherein the primary refrigerant circulation system is provided as a separate system for cooling the second refrigerant of the secondary refrigerant circulation system.

\* \* \* \* \*